US006029005A

United States Patent [19]
Radigan

[11] Patent Number: 6,029,005
[45] Date of Patent: Feb. 22, 2000

[54] METHOD FOR IDENTIFYING PARTIAL REDUNDANCIES IN A NEW PROCESSOR ARCHITECTURE

[75] Inventor: Jim J. Radigan, San Jose, Calif.

[73] Assignee: Intel Corporation, Santa Clara, Calif.

[21] Appl. No.: 08/829,933

[22] Filed: Apr. 1, 1997

[51] Int. Cl.[7] .................................................... G06F 9/45
[52] U.S. Cl. .......................... 395/709; 395/708; 395/707
[58] Field of Search .................................. 395/705, 706, 395/707, 708, 709

[56] References Cited

U.S. PATENT DOCUMENTS

| | | | |
|---|---|---|---|
| 4,435,753 | 3/1984 | Rizzi ........................................ | 395/709 |
| 4,567,574 | 1/1986 | Saadé et al. ............................. | 395/709 |
| 4,656,582 | 4/1987 | Chaitin et al. ........................... | 395/709 |
| 4,656,583 | 4/1987 | Auslander et al. ...................... | 395/709 |
| 4,710,872 | 12/1987 | Scarborough ........................... | 395/707 |
| 4,773,007 | 9/1988 | Kanada et al. .......................... | 395/709 |
| 4,782,444 | 11/1988 | Munshi et al. .......................... | 395/709 |
| 4,821,181 | 4/1989 | Iwasawa et al. ........................ | 395/500 |
| 4,833,606 | 5/1989 | Iwasawa et al. ........................ | 395/709 |
| 4,885,684 | 12/1989 | Austin et al. ........................... | 395/706 |
| 4,965,724 | 10/1990 | Utsumi et al. .......................... | 395/707 |
| 5,287,510 | 2/1994 | Hall et al. ............................... | 395/709 |
| 5,768,596 | 6/1998 | Chow et al. ............................ | 395/709 |

OTHER PUBLICATIONS

Alfred V. Aho, Revi Sethi, and Jeffrey D. Ullman, *Compilers–Principles, Techniques, and Tools*, (Addison–Wesley Publishing Co. 1988), in toto.

Ron Cytron, Jeanne Ferrante, Mark N. Wegman, Barry K. Rosen, and F. Kenneth Zadeck, "An Efficient Method of Computing Static Single Assignment Form" available from the Brown University Department of Computer Science as Technical Report No. CS–88–16 at techreports@cs.brown.edu or through http:/www.cs.brown-.edu:80 techreports/reports/CS–91–21.html, in toto.

Ron Cytron, Jeanne Ferrante, Mark N. Wegman, Barry K. Rosen, and F. Kenneth Zadeck, "Efficiently Computing Static Single Assignment Form and the Control Dependence Graph," 13 ACM Transactions on Programming Languages and Systems (1991); also available from the Brown University Department of Computer Science as Technical Report No. CS–91–21 at techreports@cs.brown.edu or through http:/www.cs.brown.edu:80/techreports/reports/CS–91–21.html, in toto.

Mark N. Wegman and F. Kenneth Zadeck, "Constant Propagation with Conditional Branches," presented at the Twelfth Annual ACM Symposium on Principles of Programming Languages, sponsored by the Special Interest Group on Automata and Computability Theory and the Special Interest Group on Programming Languages of the Association for Computing Machinery, Jan. 14–16, 1985, in New Orleans, Louisiana, available from ACM Press and from the Brown University Department of Computer Science as Technical Report No. CS–91–22 at techreports@cs.brown.edu or through http:/www.cs.brown.edu:80/techreports/reports/CS–91–22.html, in toto.

(List continued on next page.)

*Primary Examiner*—Tara R. Hafiz
*Assistant Examiner*—Kakali Chaki
*Attorney, Agent, or Firm*—Blakely, Sokoloff, Taylor & Zafman LLP

[57] ABSTRACT

The invention, in one embodiment, is a method for compiling at least a portion of a computer program. The method includes (a) inserting a phi-function for a global variable reaching a join point in the intermediate language representation subsequent to the join point without regard to the presence of ambiguity; (b) renaming a definition and any subsequent use of the definition in the intermediate language representation; and (c) identifying a partially redundant load by determining whether any of the operands of the inserted phi-function have not been renamed.

71 Claims, 11 Drawing Sheets

OTHER PUBLICATIONS

Kathleen Knobe and Kenneth Zadeck, "Register Allocation Using Control Trees," available from the Brown University Department of Computer Science as Technical Report No. CS–92–13 at techreports@cs.brown.edu or through http:/www.cs.brown.edu:80/techreports/reports/CS–92–13.html, in toto.

Eric Stoltz, Harini Srinivasan, James Hook, and Michael Wolfe, "Static Single Assignment Form for Explicitly Parallel Programs: Theory and Pratice," available at http:\\www.cse.ogi.edu/Sparse/sparse.papers.html, in toto.

Barry K. Rosen, Mark N. Wegman, and F. Kenneth Zadeck, "Global Value Numbers and Redundant Computations," presented at the Fifteenth Annual ACM Symposium on Principles of Programming Languages, sponsored by the Special Interest Group on Automata and Computability Theory and the Special Interest Group on Programming Languages of the Association for Computing Machinery, Jan. 13–15, 1998, in San Diego, California, available from ACM Press, in toto.

Fred C. Chow and John L. Hennessy, "The Priority–Based Coloring Approach to Register Allocation," 12 ACM Transactions on Programming Languages and Systems 501 (Association for Computing Machinery 1990), in toto.

Gregory J. Chaitin, Marc A. Auslander, Ashok K. Chandra, John Cocke, Martin E. Hopkins, and Peter W. Markstein, "Register Allocation via Coloring," 6 Computer Languages 47 (Pergamon Press Ltd. 1981), in toto.

G. J. Chaitin, "Register Allocation & Spilling via Graph Coloring," Proceedings of the SIGPLAN '82 Symposium on Compiler Construction, presented Jun. 23–25, 1982, Boston, Massachusetts, sponsored by the Association for Computing Machinery Speical Interest Group on Programming Languages (ACM Order No. 548820), in toto.

Vugranam C. Sreedhar, *Efficient Program Analysis Using DJ Graphs*, Ph. D. Thesis, School of Computer Science, McGill University, Quebec Canada (1995), in toto.

Gagan Agrawal, Joel Saltz, and Raja Das, "Interprocedural Partial Redundancy and its Application to Distributed Memory Compilation," UMIACS and Department of Computer Science at the University of Maryland, in toto.

John H. Reif and Harry R. Lewis, "Efficent Symbolic Analysis of Programs," 32 Journal of Computer and System Sciences 280 (Academic Press, Inc. 1986), in toto.

Mark N. Wegman and F. kenneth Zadeck, "Constant Propgation with Conditional Branches," 13 ACM Transactions on Programming Languages 181 (1991), in toto.

Gagan Agrawal and Joel Saltz, "Interproceduarl Compilation of Irregular Applications for Distributed Memory Machines," (1995), in toto.

Peter Christy, "IA–64 and Merced–What and Why," 10 Microprocessor Rep. 17 (1996), in toto.

Rosen et al., 'Global Value Numbering and Redundant Computations', ACM Symp. On Principles of Programming Languages,1988, pp. 12–27. Srinivasan et al., 'Static Single Assignment for Explicitly Parallel Programs', ACM 20th PoPL,1993,pp. 260–272.

Bernstein et al., 'Dynamic Memory Disambiguation for Array References', MICRO 27, 1994, pp. 105–111.

Aho et al., Compilers: Principles, Techniques and Tools, Addison–Wesley, 1986, pp. 432–433.

METHOD FOR IDENTIFYING PARTIAL REDUNDANCIES IN A NEW PROCESSOR ARCHITECTURE

RELATED APPLICATIONS

The invention disclosed and claimed herein is related to the following applications:

(1) my co-pending U.S. patent application Ser. No. 08/831,074, filed Apr. 1, 1997, entitled "A Method for Constructing a Static Single Assignment Language Accommodating Arbitrarily Complex Symbolic Memory References";

(2) my co-pending U.S. patent application Ser. No. 08/829,856, filed Apr. 1, 1997, entitled "A Method for Performing Common Subexpression Elimination on a Rank-n Static Single Assignment Language";

(3) my co-pending U.S. patent application Ser. No. 08/831,739, filed Apr. 1, 1997, entitled "A Method of Using Static Single Assignment to Color Out Artificial Register Dependencies";

(4) my co-pending U.S. patent application Ser. No. 08/829,847, filed Apr. 1, 1997, entitled "A Method for Identifying Partial Redundancies in Existing Processor Architectures";

(5) my co-pending U.S. patent application Ser. No. 08/831,159, filed Apr. 1, 1997, entitled "A Method for Determining the Set of Variables that May Be Ambiguously Defined at a Point in a Computer Program"; and (6) my co-pending U.S. patent application Ser. No. 08/829,980, filed Apr. 1, 1997, entitled "A Method for Optimizing a Loop in a Computer Program by Removing Loop-Invariant Loads Outside of a Loop".

These applications are hereby expressly incorporated by reference for all permissible purposes as if expressly set forth verbatim herein.

BACKGROUND OF THE INVENTION

1. Field of the Invention

This invention relates to the compilation of high level source code to machine readable object code. More particularly, the invention relates to methods for locating and, in some embodiments, removing partially redundant memory references in the presence of ambiguous memory references utilizing a static single assignment language during compiler optimization.

2. Description of Related Art

Most computer programmers write computer programs in source code using high-level languages such as BASIC, C, FORTRAN, or PASCAL. While programmers may easily understand such languages, modern computers are not able to directly read such languages. Thus, such computer programs must be translated into a language, known as machine language, that a computer can read and execute. One part of the translating process is performed by a compiler. A compiler translates a source code program, sometimes also called the source code, into object code. Object code is a machine language description of a high-level computer program.

The fundamentals of compiling a high-level language into object code are well known in the art. The reference Aho et al., *Compilers-Principles, Techniques and Tools* (Addison-Wesley Publishing Co. 1988), is hereby incorporated by reference to illustrate the state of the art with respect to many of these fundamentals. These fundamentals include (1) generating an intermediate language representation of the source code, (2) determining the flow of control through the program, (3) determining the dominance relationships among the instructions constituting the program, and (4) partial redundancy elimination.

Object code produced by conventional compiling algorithms may often be "optimized," i.e., made to execute faster. Compilers that apply code-improving transformations are called optimizing compilers. Some conventional optimizing compilers translate high-level computer programs into an intermediate language known as a Static Single Assignment (SSA) representation before generating the object code. This SSA intermediate language is used as a basis to perform certain optimizations. After these optimizations are performed, these conventional optimizing compilers translate, or generate, the SSA intermediate language into optimized object code. A deeper explanation of SSA intermediate languages follows and employs the terminology set forth immediately below.

A statement in a computer program is said to "define" a variable if it assigns, or may assign, a value to that variable. For example, the statement "x=y+z" is said to "define" x. A statement that defines a variable contains a "definition" of that variable. In this context, there are two types of variable definitions: unambiguous definitions and ambiguous definitions. Ambiguous definitions may also be called complex definitions.

When a definition always defines the same variable, the definition is said to be an "unambiguous definition" of that variable. For example, the statement, "x=y" always assigns the value of y to x. Such a statement always defines the variable x with the value of y. Thus, the statement "x=y" is an "unambiguous definition" of x. If all definitions of a variable within a particular segment of code are unambiguous definitions, then the variable is known as an unambiguous variable.

Some definitions do not always define the same variable. These definitions may possibly define different variables at different times in a computer program. Thus, they are called "ambiguous definitions." There are many types of ambiguous definitions and the principle common denominator among the many types is that they are not unambiguous definitions. One type of "ambiguous definition" occurs where a pointer refers to a variable. For example, the statement "*p=y" may be a definition of x since it is possible that the pointer p points to x. Thus, the definition may ambiguously define any variable x if it is possible that p points to x. In other words, *p may define one of several variables depending on the value of p. Another type of ambiguous definition is a call of a procedure with a variable passed by reference. When a variable is passed by reference, the address of the variable is passed to the procedure. Passing a variable by reference to a procedure allows the procedure to modify the variable. Alternatively, variables may be passed by value. When a variable is passed by value, only the value of the variable is passed to the procedure. Passing a variable by value does not allow the procedure to modify the variable. Still another type of ambiguous definition is a procedure that may access a variable because that variable is within the scope of the procedure. Still another type of ambiguous definition occurs when a variable is not within the scope of a procedure but the variable has been identified with another variable that is passed as a parameter or is within the scope of the procedure.

When a statement in a computer program references a variable, the statement is said to "use" the variable. For example, the statement "x=y+z" refers to and is said to "use" y and z while unambiguously defining x. Similarly, y and z (but not x) are "used" in the statement "x[y]=z" while unambiguously defining x[y]. A statement that uses a variable contains a "use" of that variable.

A definition of a variable "reaches" a use of that variable if that definition is the last definition of that variable prior to the use. Consider the following straight-line C pseudo code:

$$x = 6$$
$$x = x + 5$$
$$x = 7$$
$$x = x + 8$$

The definition in the first statement "x=6" reaches the use in the second statement "x=x+5." Similarly, the definition in the third statement "x=7" reaches the use in the fourth statement "x=x+8." Note that the definition in the first statement does not reach the use of the fourth statement because x is redefined in the second and third statements.

In the above example, the unambiguous definition of x in the second statement is said to "kill" the definition of x in the first statement because it nullifies the effects of the definition in the first statement. Similarly, the definitions of x in the third and fourth statements kill the definitions in the second and third statements, respectively. The period of time between the definition and the definition's kill is known as the definition's "lifetime." Only unambiguous definitions of a variable can kill other definitions of the variable. Thus, a use can be reached by both an unambiguous definition and a subsequent ambiguous definition of the same variable.

A computer programmer may address a variable by specifying the variable's location in memory. This location is known as the variable's absolute address. This method of addressing is known as direct addressing. Direct addressing commonly occurs when a variable is specified by its name. For example, in the statement "y=x," both y and x are directly addressed.

A computer programmer may also address a variable by specifying an address that refers to a different address, which may specify yet another address. This method of addressing is known as indirect addressing. Common examples of indirect addressing include pointers, arrays and combinations of pointers and arrays. Examples of indirect addressing include a[i], *p, *(p+4), **p, a[b[i]], and *(*p+4). When a variable is indirectly addressed, at least one indirect memory reference is employed to determine the absolute address of the variable.

A variable may be classified based upon the number of indirect memory references employed to determine the absolute address of the variable. For example, as discussed above, y and x may be directly addressed. Thus, there are zero indirect memory references employed to determine the absolute address of both y and x. These variables are known as rank-0 variables.

A variable employing a single indirect memory reference is known as a rank-1 variable. Examples of rank-1 variables include single pointer references and single array references such as a[i], *p, and *(p+4). A variable that requires two indirect memory references is known as a rank-2 variable. Rank-2 variables include double pointer references and double array references and the combination of a single pointer reference and a single array reference. Examples of rank-2 variables include **p, a[b[i]], and *(*p+4). A rank-n variable employs n indirect memory references to determine the absolute address of the variable.

A definition that defines a rank-n variable is known as a rank-n definition. Similarly a use of a rank-n variable is known as a rank-n use. For example, the definition of the array element b[a[i]] is a rank-0 use of the variable i, a rank-1 use of the array element a[i], and a rank-2 definition of the array element b[a[i]].

When a computer program is conventionally translated into a SSA intermediate language, each variable definition is given a unique name. Further, all the uses reached by that definition are also renamed to match the variable's new name. For example, consider the straight-line C pseudo code discussed above. When this C pseudo code is translated into a SSA intermediate language, the result would be the following:

$$t_1 = 6$$
$$t_2 = t_1 + 5$$
$$t_3 = 7$$
$$t_4 = t_3 + 8$$

The symbols $t_1$ through $t_4$ are known as compiler temporaries or even more commonly as temps. Unlike most variables, temps have only a single definition. Because a temp has only a single definition, it may not be ambiguously defined and is unaliasable scalar. Because temps are unaliasable scalars, an expression using $t_1$ has a different symbolic meaning from the symbolic meaning of an otherwise identical expression using i. Every use of i cannot be considered equal because i represents an aliasable variable. However, every use of $t_1$ can be considered equal. While a compiler may not be able to determine the value contained in a temp, every use of that temp will return the same unknown value. Therefore, temps dramatically simplify certain compiler algorithms.

Unlike the above straight-line C pseudo code, programs typically also contain branch statements. A branch statement is a statement that selects one set of statements from a number of alternative sets of statements. For example, consider the following if-then-else statement:

$$\textit{if } (p) \textit{ then}$$
$$\{x = 4\}$$
$$\textit{else}$$
$$\{x = 6\}$$
$$x = 2 + x$$

The flow of control through this segment of code during execution will branch depending on whether p is true or false and will unite again at the statement "x=2+x." The point where the control flow branches is known as the "branch point and the point where it unites is known as the "join point" or "influence point."

When this C pseudo code is translated into a SSA intermediate language, the result would be the following:

$$\textit{if } (p) \textit{ then}$$
$$\{t_1 = 4\}$$
$$\textit{else}$$
$$\{t_2 = 6\}$$
$$t_3 = \phi(t_1, t_2)$$

-continued $$t_4 = 2 + t_3$$

Depending on the value of p, either $t_1$ will be defined as 4 or $t_2$ will be defined as 6. In order to "join" these two definitions, a special definition called a phi-function is inserted at the point where the branches join. Phi-functions are known by those skilled in the art.

The above phi-function contains two operands. An operand is a quantity that enters into (or results from) an operation. The operands indicate which definitions reach the join point. In this example, both $t_1$ and $t_2$ reach the join point. Thus, both $t_1$ and $t_2$ are operands to the phi-function that defines $t_3$. As shown above, subsequent uses of x in the original program would use $t_3$ in the corresponding SSA intermediate language. Phi-functions and their use in SSA intermediate language representations is set forth more fully in Ron Cytron et al., "Efficiently Computing Static Single Assignment Form and the Control Dependence Graph," ACM Transactions on Programming Languages and Systems, Vol. 13, No. 4 (1991). This article by Cytron et al. is hereby expressly incorporated by reference for the purpose of teaching the state of the art as to phi-nodes and conventional SSA intermediate language representations.

Conventional SSA intermediate languages can accommodate only rank-0 variables. Ambiguous definitions and uses reached by ambiguous definitions cannot be renamed as temps. Phi-nodes also cannot be inserted in conventional SSA intermediate languages without temps. Therefore, phi-nodes cannot conventionally be inserted in the presence of ambiguity interjected by ambiguous definitions and their uses. Thus, rank-1 and rank-2 variables are not included in conventional SSA intermediate languages. Because such intermediate languages contain only a limited amount of symbolic information, only limited optimizations may be based on such languages. Thus, in order to perform significant optimizations, numerous ad hoc algorithms are employed. These conventional algorithms are inefficient, incomplete, not well defined, and complex.

Partial redundancy elimination ("PRE") is one type of optimization to which flow control and dominance are important concepts. Removing memory references is the most important optimization possible during compilation. One type of unnecessary memory reference that may be removed is known as a "partially redundant" memory reference. A partially redundant memory reference is a memory reference that is identical to a prior memory reference occurring along one control flow path but not all control flow paths. To reduce execution time, the partially redundant memory references should be eliminated.

A number of PRE techniques are known to the art. See, e.g., Agrawal, et al., "Interprocedural Partial Redundancy Elimination and Its Application to Distributed Memory Compilation." However, a weakness of all conventional PRE methods is efficiently and accurately determining the optimal position to move code so that uses are dominated by one definition and the resulting lifetime is minimal. Conventional PRE methods are employed, if at all, as part of the cumbersome, inefficient, ad hoc optimization performed on rank-0 intermediate language representations just prior to generating machine readable object code. These conventional methods also necessarily involve numerous bitsets and complex iterative data flow calculations to identify partial redundancies. Still further, PRE typically is not performed on even rank-0 SSA intermediate language representations for these and other reasons. Thus, a need exists for a quicker, more efficient method to eliminate partially redundant memory references in a wider variety of contexts.

SUMMARY OF THE INVENTION

The invention, in one embodiment, is a method for compiling at least a portion of a computer program. The method includes (a) inserting a phi-function for a global variable reaching a join point in the intermediate language representation subsequent to the join point without regard to the presence of ambiguity; (b) renaming a definition and any subsequent use of the definition in the intermediate language representation; and (c) identifying a partially redundant load by determining whether any of the operands of the inserted phi-function have not been renamed.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

DETAILED DESCRIPTION OF PARTICULAR EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. For instance, the invention is placed in the overall context of a compilation process including determinations of flow control and dominance relationships to facilitate an understanding of the invention even though the invention may not be so limited. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

Figure 1:
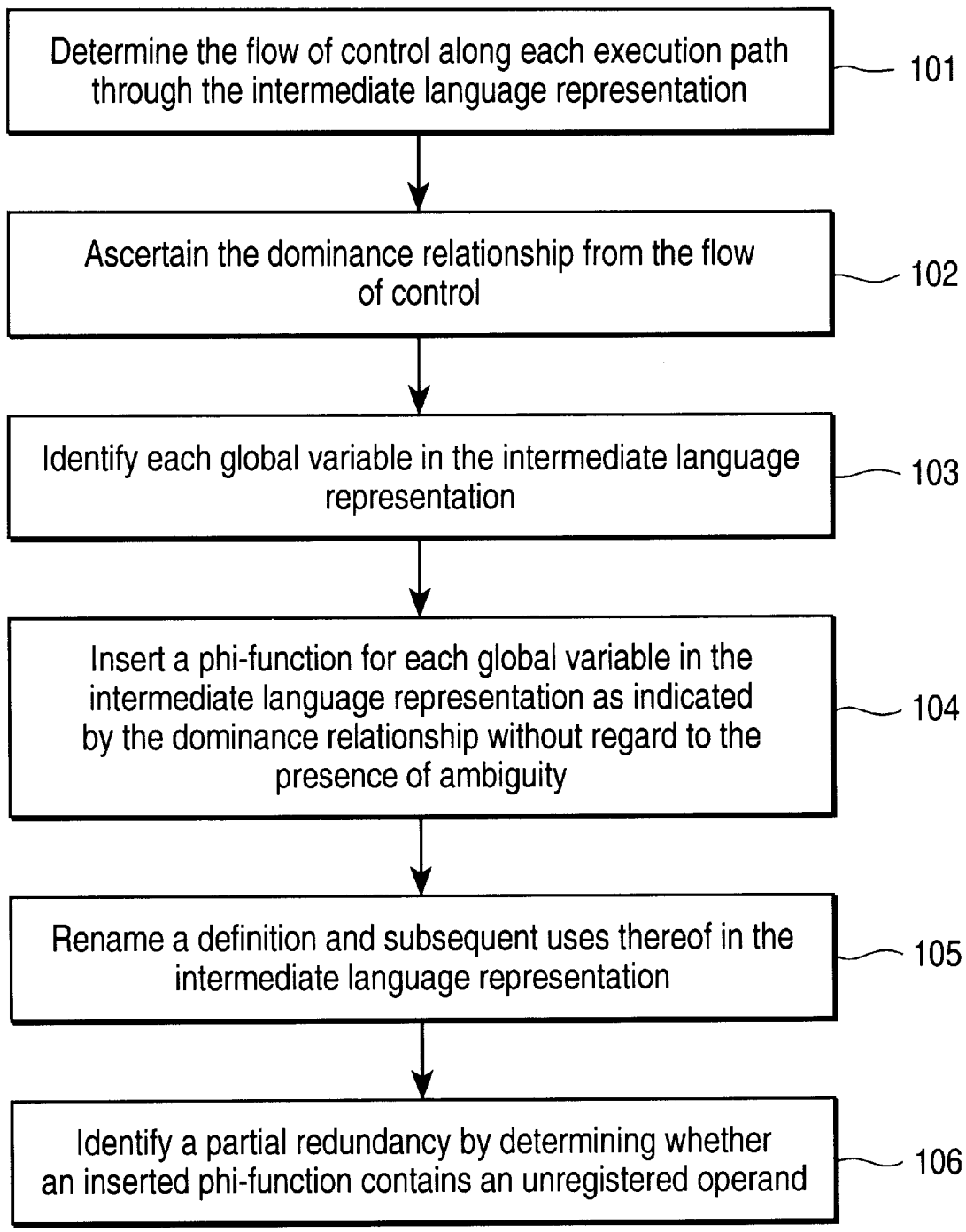
FIG. 1 diagrams a specific embodiment of the present invention for identifying partial redundancies in an intermediate language representation of at least a portion of source code.

FIG. 1 illustrates one embodiment of the invention for identifying partial redundancies that may be eliminated from an intermediate language representation of at least a portion of high-level source code during compilation. The present invention is related to the inventions disclosed and claimed in my co-pending applications Ser. No. 08/829,847, filed Apr. 1, 1997, entitled "A Method for Identifying Partial Redundancies in Existing Processor Architectures," and to my application Ser. No. 08/829,980, filed Apr. 1, 1997, and entitled, "A Method for Optimizing a Loop in a Computer Program by Removing Loop Invariant Loads Outside of a Loop." More particularly, the present invention identifies partial redundancies in a manner similar to that of Ser. No. 08/829,847, and eliminates them while incorporating the "advanced load" and "load check" features of Ser. No. 08/829,980, into the method of Ser. No. 08/829,847. The similarities and differences are discussed more fully below and both these applications are hereby expressly incorporated for all purposes.

The embodiment of FIG. 1 presumes that an initial intermediate language representation has previously been generated. Intermediate language representations and their generation are well known in the art. Any technique and any conventional SSA intermediate language representation known in the art will suffice provided the technique results in a rank-0 SSA representation. However, some techniques and representations may be more advantageous than others depending on external factors such as the high-level language in which the source code is written and the microprocessor for which the source code is compiled.

Referring to FIG. 1, block 101 the compiler for the embodiment illustrated therein first determines the flow of control along each execution path through the intermediate language representation. One important concept in optimizing compilers is the flow of control along all paths of execution through the intermediate language representation. Flow control determines which path of execution through any given piece of code is followed. Thus, for the following, previously discussed, code:

$$\text{if } (p) \text{ then}$$
$$\{x = 4\}$$
$$\text{else}$$
$$\{x = 6\}$$
$$x = 2 + x$$

and its SSA intermediate language representation:

$$\text{if } (p) \text{ then}$$
$$\{t_1 = 4\}$$
$$\text{else}$$
$$\{t_2 = 6\}$$
$$t_3 = \phi(t_1, t_2)$$
$$t_4 = 2 + t_3$$

there are two possible paths of execution along which control of program execution might flow depending on the value of p. First, if p is true, then x is unambiguously defined as 4 and control skips to unambiguously define x as x+2. Second, if p is false, then control skips to unambiguously define x as 6 whereupon control flows sequentially to unambiguously define x as x+2. Thus, an analysis determining the flow of control through the source code and the intermediate language representation would yield two paths of execution.

The flow of control is important because it determines whether any particular variable definition uses or is used by another particular definition and whether it reaches or is reached by another particular definition. It is also important because it determines whether any particular instruction or set of instructions "dominates" another instruction or set of instructions as set forth below. Many kinds of optimizations depend on accurate determination of these characteristics and hence the importance of flow control determination. A variety of techniques are known in the art for determining the flow of control in an intermediate language representation, the most notable of which is a technique known as "flow control graphing," as is discussed more fully below. Any suitable technique known to the art may be employed.

Again referring to FIG. 1, block 102 the compiler next ascertains the dominance relationship from the flow of control. Typically, the compiler performs this act on basic blocks of instructions. Compilers typically partition the intermediate language representation into and process instructions in groups known as basic blocks. A basic block is a sequence of consecutive statements in a computer program in which flow of control enters at the beginning and leaves at the end without halt or possibility of branching except at the end. The process of grouping instructions into basic blocks is known as "partitioning."

The following sequence of instructions:

$$\text{if } (p) \text{ then}$$
$$\{t_1 = 4\}$$
$$\text{else}$$
$$\{t_2 = 6\}$$
$$t_3 = \phi(t_1, t2)$$
$$t_4 = 2 + t_3$$

may consequently be partitioned into basic blocks as follows:

$$\text{if } (p) \text{ then}$$

-continued $$\{t_1 = 4\}$$

else $$\{t_2 = 6\}$$

$$t_3 = \phi(t_1, t_2)$$

$$t_4 = 2 + t_3$$

Thus, there are at least four basic blocks. The first statement forms a basic block because control may proceed sequentially to the second instruction or branch to the third instruction depending on the value of p. The second statement forms a basic block because control will necessarily branch to the fifth statement. The third and fourth statement and the fifth and sixth statements may be partitioned as shown because control will necessarily flow from the third instruction to the fourth and from the fifth to the sixth but will necessarily branch after the fourth instruction. However, the two groups must be partitioned from each other because of the possibility of control branching from the second to the fifth instructions. Note how the flow of control defines the basic blocks.

Besides providing the ability to process groups of instructions simultaneously, basic blocks are useful in that the separate instructions contained therein may be partitioned into separate basic blocks. The instructions of the example above, for instance, can be partitioned into as many as six basic blocks if desirable or necessary. Thus, processing individual instructions is synonymous with processing basic blocks even though basic blocks are generally understood to constitute groups of instructions. The concept of basic blocks and their use are well known in the art.

The compiler determines the dominance relationship for each basic block relative to the other basic blocks in the intermediate language representation. An instruction or basic block A is said to dominate an instruction or basic block B if every path of execution to B goes through A. This means that any particular instruction or basic block can dominate only instructions and basic blocks subsequently encountered along a path of execution but does not necessarily dominate any particular subsequently encountered instruction. Conversely, not all instructions subsequently encountered along a flow path are dominated by prior instructions. Subsequently encountered, undominated instructions are said to be in each other's dominance frontier. A classic example of such a dominance frontier instruction would be the instruction immediately subsequent to an if-then loop.

For instance, in the following code separated into four basic blocks if (p) then $$\{x = 4\}$$

else

-continued $$\{x = 6\}$$

$$x = 2 + x$$

the first basic block dominates all others since any path along which control might flow must flow there through. However, because of the branch in the control flow depending on the value of p, the second basic block does not dominate the third basic block. Also, neither the second nor the third basic block dominates the fourth since the fourth basic block will be reached by passing one or the other depending on the control flow. The second and third basic blocks therefore do not dominate any other. Note that the first statement of the third basic block dominates the second statement therein because control must pass through the third statement to reach the fourth. The fourth basic block does not dominate any other because it is the last basic block in the flow of control.

This analysis also defines the dominance frontier of each statement. Thus, the third and fourth basic blocks are in the dominance frontier of the second; the second and fourth basic blocks are in the dominance frontier of the third; and second and third basic blocks are in the dominance frontier of the fourth basic block. Note how (1) the flow of control determines dominance, and (2) basic blocks dominate only subsequent statements as defined by the control flow. Also note how grouping the instructions of the third basic block rather than partitioning them into two separate basic blocks simplified the analysis without altering the results. Since dominance is determined by the flow of control, ascertaining the dominance relationship should follow determination of the flow of control discussed immediately above. Techniques for identifying and ascertaining dominance are known in the art, the most notable of which is the construction of "dominator trees" as is discussed more fully below. Any suitable technique known to the art may be used.

As shown in FIG. 1, block 103 the compiler next identifies each global variable in the intermediate language representation. Computer programs transfer data between constants, variables, and files by the execution of statements, procedures, and modules. This data can be said to "flow" through a computer program. This concept is generally referred to as "data flow" and is very different from the flow of control, or "control flow," discussed above. Data flow is a very important concept in compilation of high level source code for many reasons, not all of which are presently pertinent. However, some compilers analyze this flow of data and perform certain optimizations based on the analysis results. One aspect of data flow that is currently important is whether a variable is a local variable or a global variable.

A global variable for present purposes shall be any variable used in a basic block that must reach outside the basic block to find a definition. All other variables will be "local variables." Thus, in the following example:

if (p) then $$\{x = 4\}$$

else $$\{x = 6\}$$

-continued
$$x = 2 + x$$

p is a global variable because it is used without a previous definition within the first basic block. This use of p therefore reaches out of the basic block for a value. However, x is a local variable in the second and third basic blocks, but is a global variable in the fourth basic block because the definition, or redefinition, of x contains a use of x that reaches out of the basic block. The concept of "global variables" and techniques for their identification are well known in the art. Any technique known to the art to be suitable for this purpose may be used.

Referring once again to FIG. 1, block 104 the compiler next inserts a phi-function for each global variable in the intermediate language representation as indicated by the dominance relationship without regard to the presence of ambiguity. Techniques for inserting phi-functions are well known in the art. Any such technique known in the art is suitable with one exception.

Contrary to the present invention, known techniques for inserting phi-functions do not do so in the presence of ambiguity. However, the present invention inserts phi-functions without regard to the presence of ambiguity as is set forth in FIG. 1. The present invention overcomes the difficulties associated with ambiguity by incorporating the "advanced load" and "load check" features disclosed and claimed in my application Ser. No. 08/829,980, as is explained more fully below. These features are not available in current processor architectures. The present invention therefore must be implemented on "new" architectures utilizing the "advanced load" and "load check" enhancements.

Once again referring to FIG. 1, the compiler next renames the definitions in the intermediate language representation to compiler temporaries. More particularly, each rank-0 definition and each of the uses it reaches are renamed to a compiler temporary in a manner well known to the art. Only rank-0 definitions and the uses they reach are renamed, but all ambiguous definitions and all ambiguous uses remain unnamed. Where the operands of a phi-node are unambiguous uses of a renamed definition, those operands are also renamed. The particular embodiment of FIG. 1 performs a depth-first ordered traversal of each flow control path in a manner known to the art. During the traversal, definitions and uses are stored. A search is performed for a use that has a previous corresponding definition or use. If such a use is found and no ambiguous definition is between the previous definition or use and the subsequent use, then the prior definitions and/or uses and the subsequent use are renamed. Renaming definitions and their uses in this manner registerizes the renamed definitions and guarantees that every use will have at most one reaching definition for any rank-0 unambiguous reference.

As shown in FIG. 1, the compiler next determines which inserted phi-functions contain at least one unregisterized operand. The use of unregisterized operands in a phi-function marks the presence of partially redundant memory references. Thus, by identifying the inserted phi-functions containing unregisterized operands, the compiler readily identifies partially redundant memory references in a quick and efficient manner. Once identified, the partial redundancies may be eliminated in any manner known to the art.

An illustrative example of this embodiment's operation is illustrated in FIGS. 2A–2D. The illustrative example employs a portion of high level source code similar to examples previously discussed. For the sake of clarity, only certain statements pertinent to the illustration will be shown.

The following intermediate language representation of a portion of high-level source code will be used throughout this illustrative example:

$$\textit{if } (p) \textit{ then}$$
$$($$
$$($$
$$($$
$$\textit{else}$$
$$\{i = 1\}$$
$$\{x = a[i]\}$$
$$\{b = x\}$$
$$($$
$$($$
$$($$

$$x = a[i]$$

Note that x is ambiguously defined using a[i], which is an ambiguous global variable.

The compiler first determines the flow of control along each execution path through the intermediate language representation. This particular illustrative example employs a flow graph such as the one conceptually illustrated in FIG. 2A to determine the flow of control, although as noted elsewhere the invention is not limited to the use of flow graphs. A flow control graph, by definition, indicates all possible flow control paths through the intermediate language representation.

Flow graphs are typically constructed from basic blocks of code. Basic blocks are segregated into the nodes of the graph such that a single basic block inhabits each node. The flow of control through the code is represented by the directed edges between the nodes. The intermediate language representation shown above can be partitioned into basic blocks as set forth below, assuming there are no branching or conditional statements other than those shown:

$$\textit{if } (p) \textit{ then}$$
$$($$
$$($$
$$($$
$$\textit{else}$$
$$\{i = 1\}$$
$$\{x = a[i]\}$$
$$\{b = x\}$$
$$($$
$$($$
$$($$

-continued $$x = a[i]$$

Figure 2A:
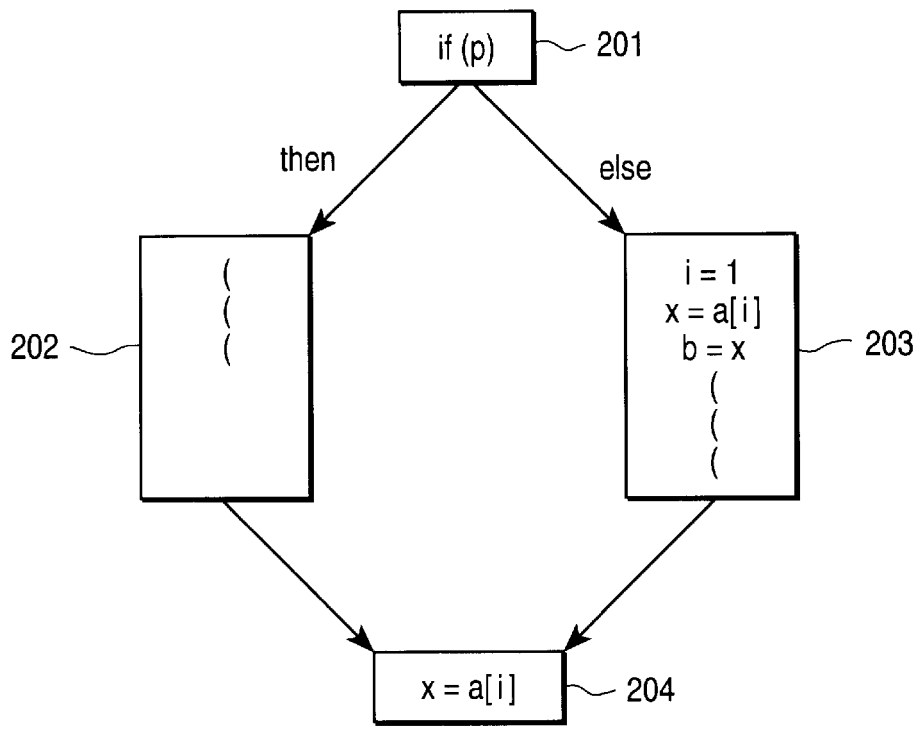
FIGS. 2A–2D conceptually illustrate one particular embodiment of the invention diagrammed in FIG. 1.

The flow graph of FIG. 2A is predicated on this partitioning. For ease of reference, the basic blocks set forth above shall hereafter be referred to as the first through fourth 201, 202, 203, 204 basic blocks, respectively.

As shown in FIG. 2A, partitioning the basic blocks as set forth above defines the nodes of the flow graph such that each basic block inhabits a single node in FIG. 2A. The directed edges depict the flow of control in the code through the basic blocks. As discussed above, each instruction may in itself constitute a basic block if necessary or desirable. Grouping instructions into basic blocks as shown reduces the amount of control flow information that must be considered at any given time.

Reference to FIG. 2A reveals one partial redundancy in this illustrative example. Through the right control flow path, i.e., the path through the first, third 201, 203, and fourth 204 basic blocks, there is one load for the global variable a[i]. Through the left control flow path, i.e., the path through the first 201, second 202, and fourth 204 basic blocks, there are no loads of a[i]. Thus, by definition, the expression a[i] is partially redundant. The goal of partial redundancy elimination is to eliminate as many partial redundancies as efficiently as possible by balancing the number of loads for any given symbolic expression through the flow control paths of the intermediate language representation.

The compiler next, as shown in FIG. 1, ascertains the dominance relationship from the flow of control. This particular illustrative example employs a "dominator tree" as is conceptually illustrated in FIG. 2B, although as noted elsewhere the invention is not limited to the use of dominator trees. Similarly to the flow control graph, each basic block inhabits a single node of the dominator tree but, in contrast to the flow control graph, the directed edges indicate the dominance relationship rather than the flow of control. Note that the individual instructions could have been partitioned into separate basic blocks if so desired.

Figure 2B:
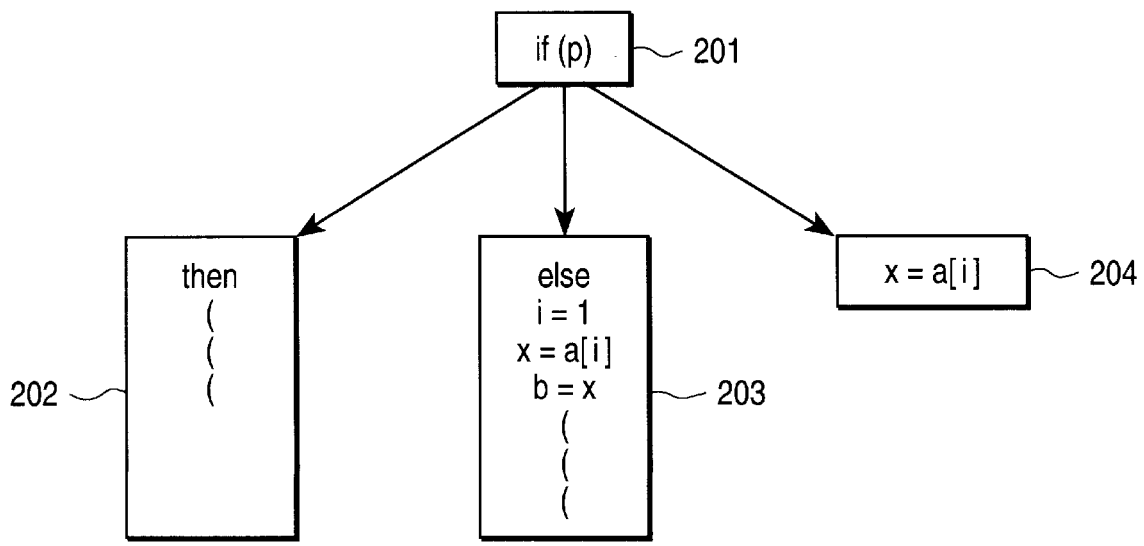
Figure 2C:
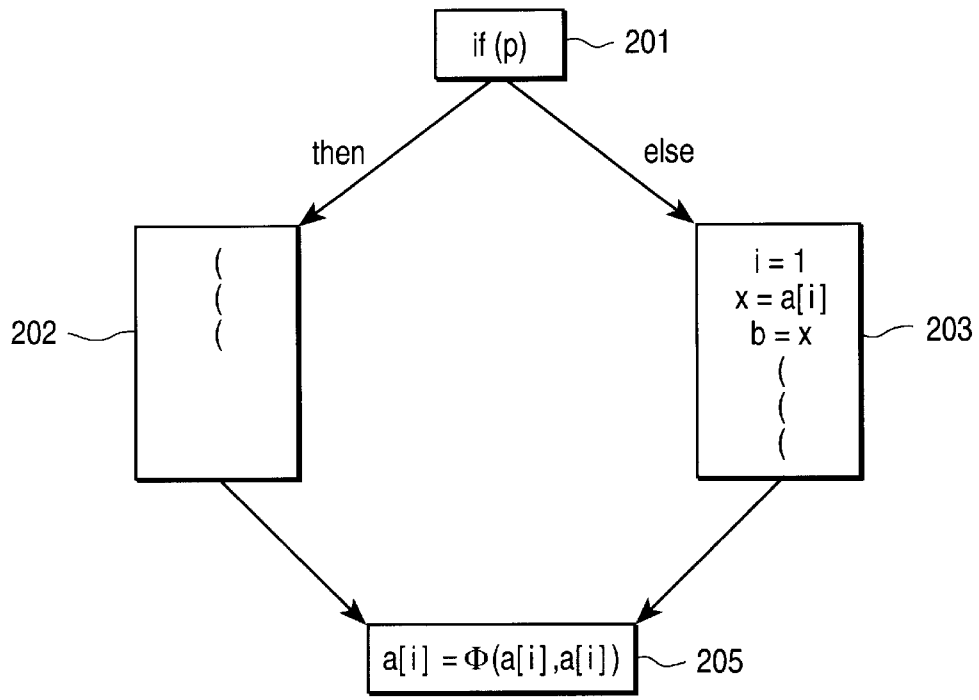

Referring more particularly to FIG. 2B, there are two possible flow paths through the intermediate language representation and the dominator tree correspondingly branches to reflect the dominance relationship. The statement in the first 201 basic block is the conditional construct governing control flow through this piece of code and it therefore dominates the second through fourth 202, 203, 204 basic blocks. However, the second 202 and third 203 basic blocks lie along different flow paths, each bypassing the other, and neither dominates the other. Thus, the second 202 basic block is in the dominance frontier of the third 203 and vice-versa. The fourth 204 basic block can be reached along either of the two flow paths and therefore neither the second 202 nor the third 203 basic blocks dominates the fourth 204. Thus, the fourth 204 basic block is in the dominance frontier of the second 202 and third 203 basic blocks and vice-versa.

As shown in FIG. 1, the compiler next identifies the global variables, which is then followed by phi-node insertion. Recall that a global variable is any variable used in a basic block that must reach outside the basic block to find a definition. Thus, upon reviewing either FIG. 2A or FIG. 2B, p in the first 201 basic block and a[i] in the third 203 basic block are global variables. However, not all global variables are found at a join point and so phi-functions are not inserted for all global variables in the example code segment. Only a[i] in the third 203 basic block is both a global variable and found at a join point. Thus, a phi-function is inserted in the fourth 205 basic block as indicated by the dominance relationship at the join point as shown in the modified flow control graph of FIG. 2C.

Figure 2D:
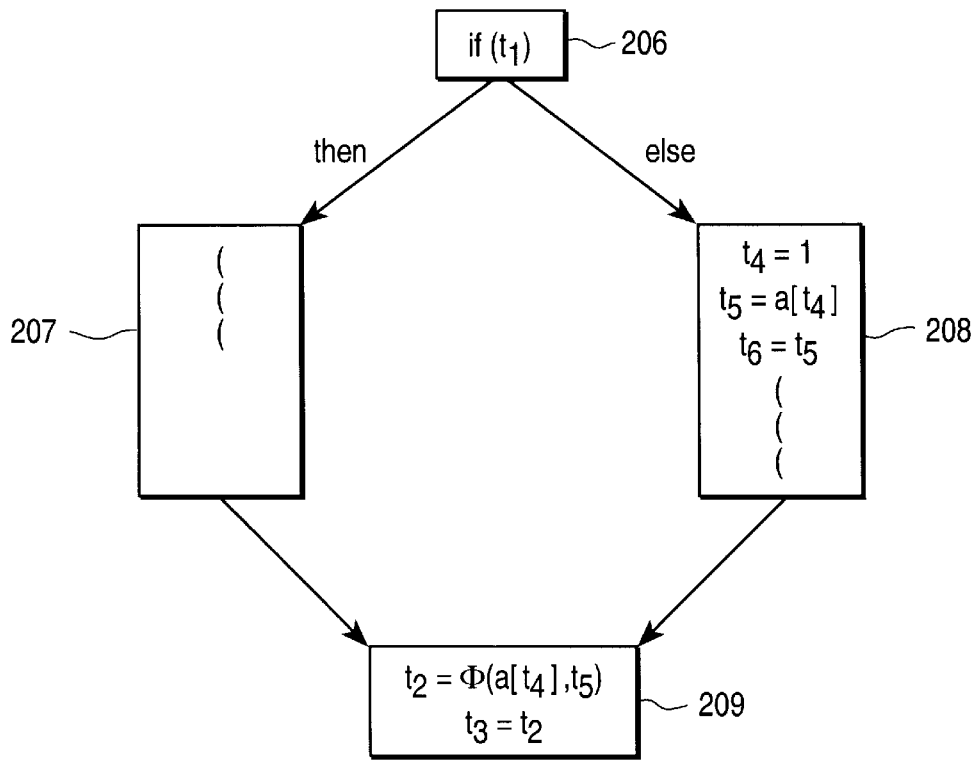

Returning to FIG. 1, the compiler next renames definitions in the intermediate language representation as described above. The illustrative embodiment does this in the course of a depth-first ordered traversal of the flow control graph illustrated in FIG. 2C as is known in the art. However, the invention is not necessarily limited to depth-first ordered traversals of flow control graphs as the invention may admit to other equally effective embodiments. Referring to FIG. 2D now, the compiler visits the first 206 basic block and renames the variable p, which is not subsequently used, to $t_1$. The compiler next visits the second 207 basic block wherein various definitions, which are not shown for the sake of clarity, and their uses are renamed. Because the traversal is depth-first ordered, the compiler next visits the fourth 209 basic block and renames the variable expressions defined therein and their uses, including the phi-nodes and their operands. The compiler then visits the third 208 basic block wherein the variable expressions defined and their uses are also renamed. The compiler then finishes the traversal by revisiting the fourth 209 basic block to rename definitions and uses.

Renaming these symbolic expressions to compiler temporaries "registerizes" them. Variables in high-level languages are an abstraction of memory locations. One of the compiler's tasks when translating a high-level computer language program into object code is to assign these abstract variables into physical locations. Memory locations may be either registers in a processor or memory external to processors. An optimizing compiler that utilizes a SSA intermediate language typically attempts to assign as many variables as possible to temps. Because temps may be placed in registers, numerous loads and stores to/from external memory may often be eliminated. However, not all variables may be assigned to temps. In some circumstances a variable may be assigned to a location within external memory. The method that a compiler utilizes to assign variables to registers and memory locations in part determines the execution time of a computer program. One conventional method of assigning variables to registers is to assign as many variables to registers as possible and then assign any remaining variables to external memory. Another method of assigning variables is to assign registers to the variables that have the greatest utilization and then assign any remaining variables to external memory.

The compiler next identifies whether any inserted phi-node contains at least one unregisterized operand, i.e., an operand that has not been renamed. One particular embodiment of the invention maintains a linked list of all inserted phi-nodes and identifies phi-nodes by traversing the linked list. A linked list in this context is a list of phi-nodes and pointers, the pointers pointing to the memory location of the next element in the list. However, this linked list and the traversal thereof are not strictly necessary to the practice of the invention. As noted earlier, a[i] is partially redundant along the right hand control flow path. Reference to FIG. 2D shows that the phi-node for a[i] has an unregisterized operand-the very expression that is partially redundant. Thus, the invention as disclosed above quickly and efficiently identifies partial redundancies in an SSA intermediate language representation for elimination.

One particular embodiment of the invention actually eliminates the identified partial redundancies using a previously unknown variant of a data speculation technique known as "backpatching." Backpatching is a technique traditionally used in generating code for Boolean expressions in flow of control statements in a single pass compiler. However, the technique is modified for the present invention in a previously unknown and unsuspected manner for eliminating partial redundancies as set forth immediately below.

Figure 3A:
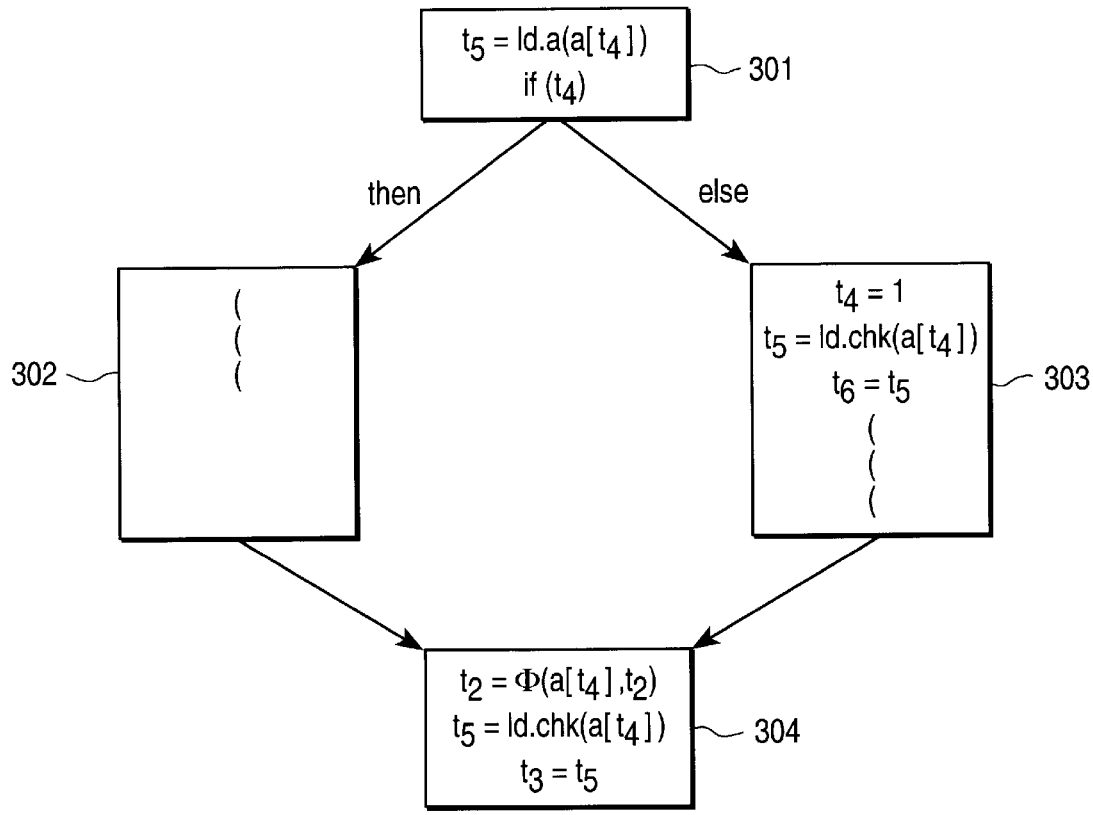
FIG. 3A conceptually illustrates a data speculation technique for eliminating partial redundancies identified by the specific embodiment of FIG. 1.

The variant is illustrated in FIG. 3A, blocks 301, 302, 303, 304, which builds on the intermediate language representation of FIG. 2D. The goal of partial redundancy elimination is to balance the number of loads for any symbolic expression along each flow control path. This technique backpatches the use to the nearest common ancestor in the flow control paths at the joint point as indicated by the dominance relationship. The compiler does this by inserting an "advanced load" (ld.a) of the global variable at that point just prior to the branch in the flow of control. Because this statement loads the variable expression, a[i] in the illustrative example, prior to the statement that actually uses the expression, it is referred to as an "advanced load." Reference to FIG. 2B shows the nearest common ancestor in this case to be the first 201 basic block and the branch in the control of flow at the conditional statement. Thus, the advanced load is inserted just prior to the conditional statement, as shown in FIG. 3A, block 301.

The compiler then inserts a "load check" (ld.chk) just prior to each subsequent use of the global variable in the code segment as is shown in FIG. 3A, blocks 303 and 304. The load check statement first checks whether the variable x has been written to at any point between the advance load and load check statements. If and only if the variable expression has been written to at a point between the advance load and the load check statements, then the variable expression is reloaded from memory. The temp is then defined with the reloaded value and, because the temp was defined with the reloaded value, the temp is defined with the value of the variable expression just prior to the load check statement.

The "advanced load" and "load check" enhancements may be employed in several variations in alternative embodiments. In some embodiments of the invention, the load check statement may also contain an operand that points to a handler routine. The handler routine would include one or more statements that would be executed if the address of the variable expression has been written to at a point between the advance load and load check statements. For example, a handler operand for the above load check statement might point to a statement that reloads a[i] and then defines $t_1$ with the reloaded value of a[i]. In another embodiment, the advance load and load check statements are inserted during the construction of a rank-0 SSA intermediate language. Thus, the statements would be inserted into a rank-0 SSA intermediate language. In another embodiment of the invention, the statements would be inserted during the construction of a rank-1 SSA intermediate language. Thus, the statements would be inserted into a rank-1 SSA intermediate language. In still another embodiment of the invention, the statements would be inserted during the construction of a rank-2 SSA intermediate language. Thus, the advance load statement would be inserted into a rank-2 SSA intermediate language. This variation can be extrapolated generally to any rank-n SSA intermediate language such as that discussed immediately below.

Figure 3B:
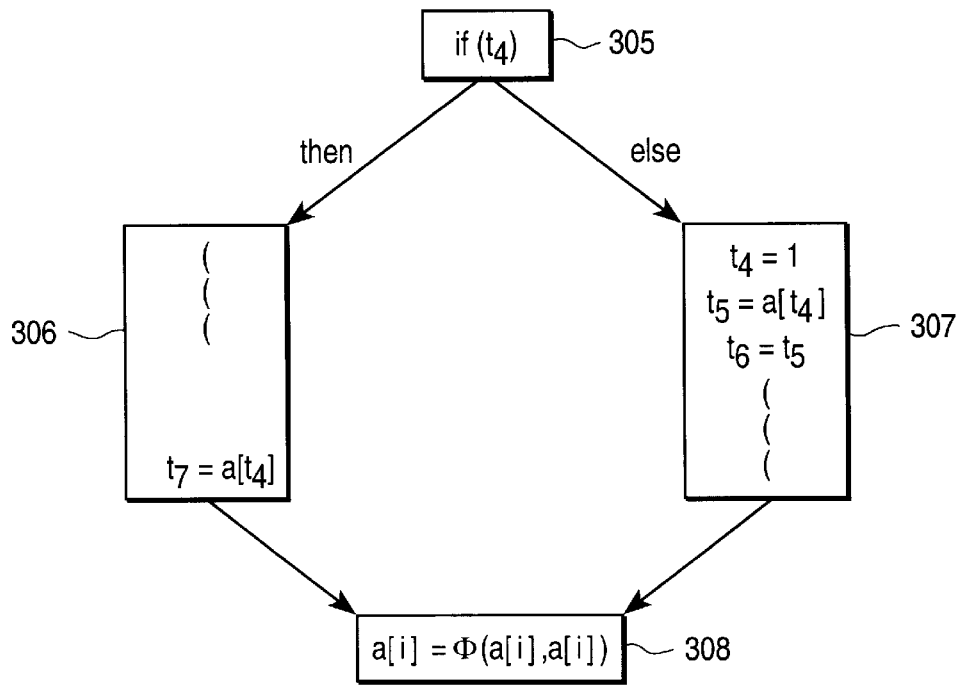
FIGS. 3B and 3C conceptually illustrate data speculation techniques for eliminating partial redundancies as disclosed and claimed in my co-pending application Ser. No. 08/829,847, entitled "A Method for Identifying Partial Redundancies in an Existing Processor Architecture," filed Apr. 1, 1997, which techniques may be combined with that of FIG. 3A in some embodiments of the present invention.
Figure 3C:
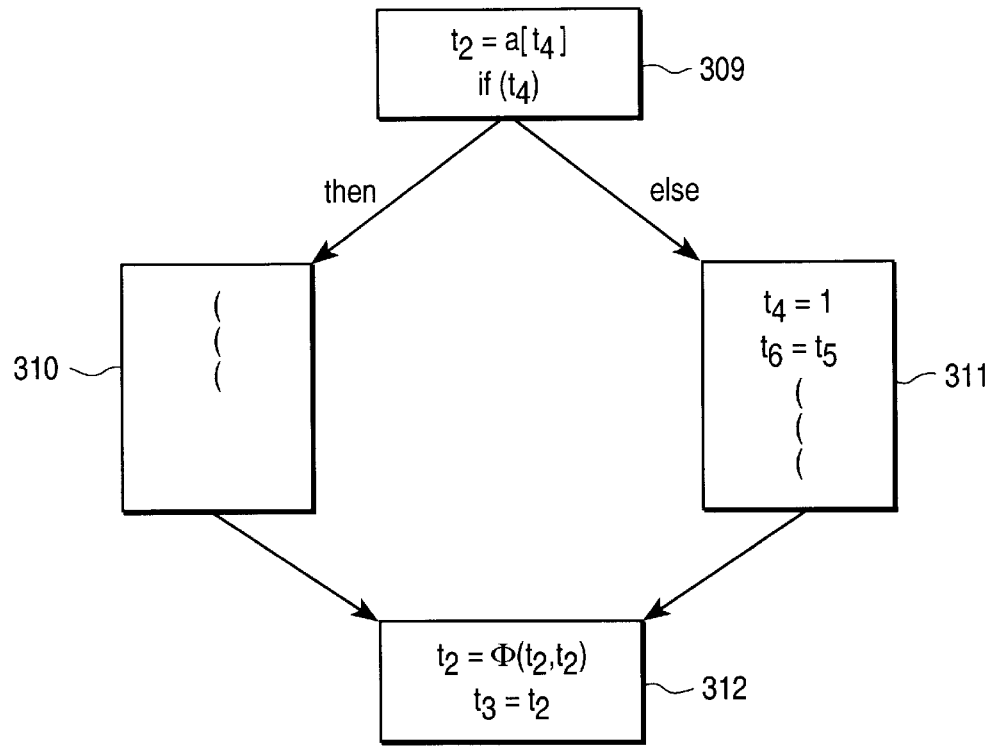
Figure 4A:
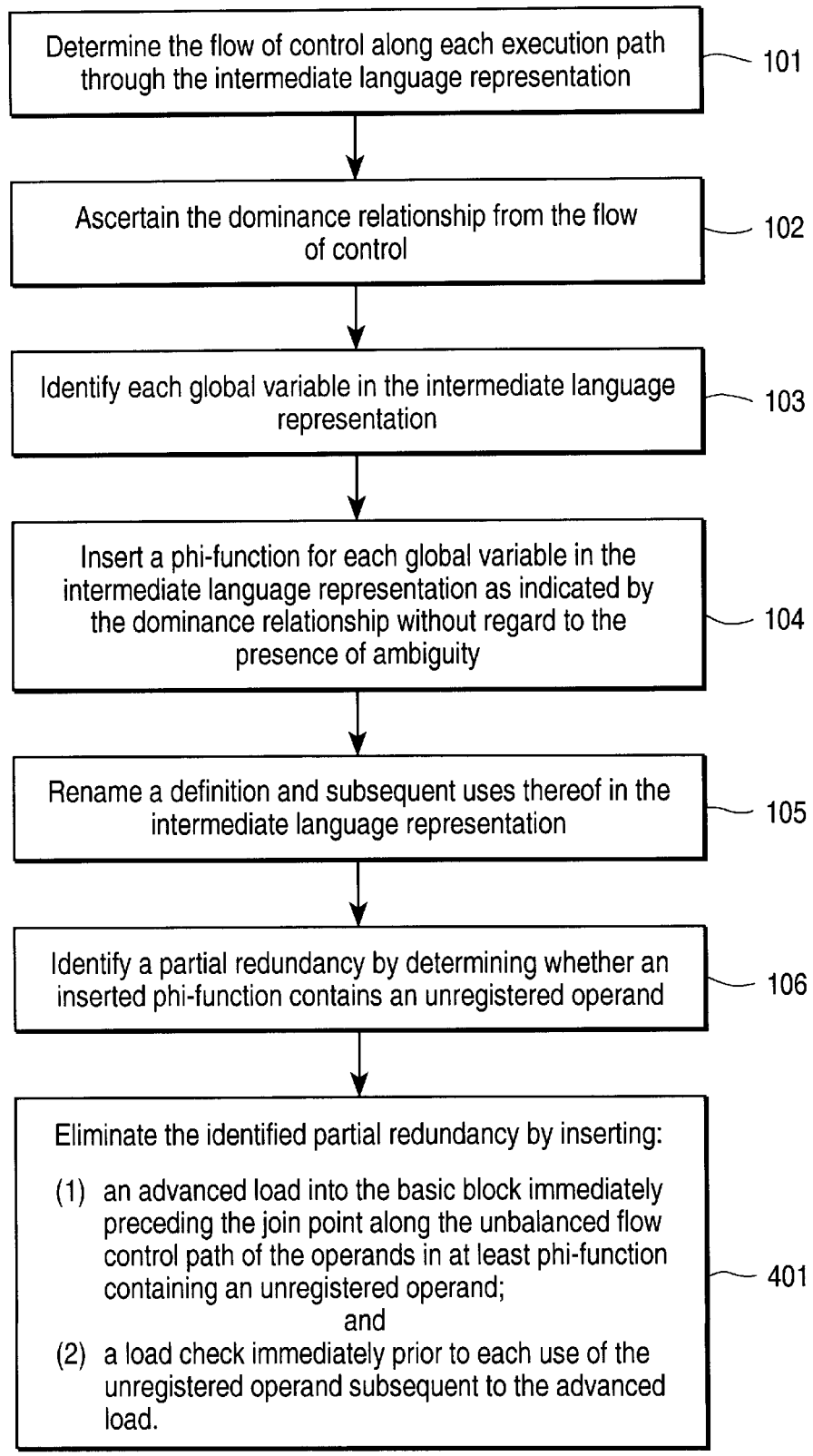
FIGS. 4A–4B illustrate alternative embodiments of the present invention employing the PRE techniques of FIGS. 3A–3C.
Figure 4B:
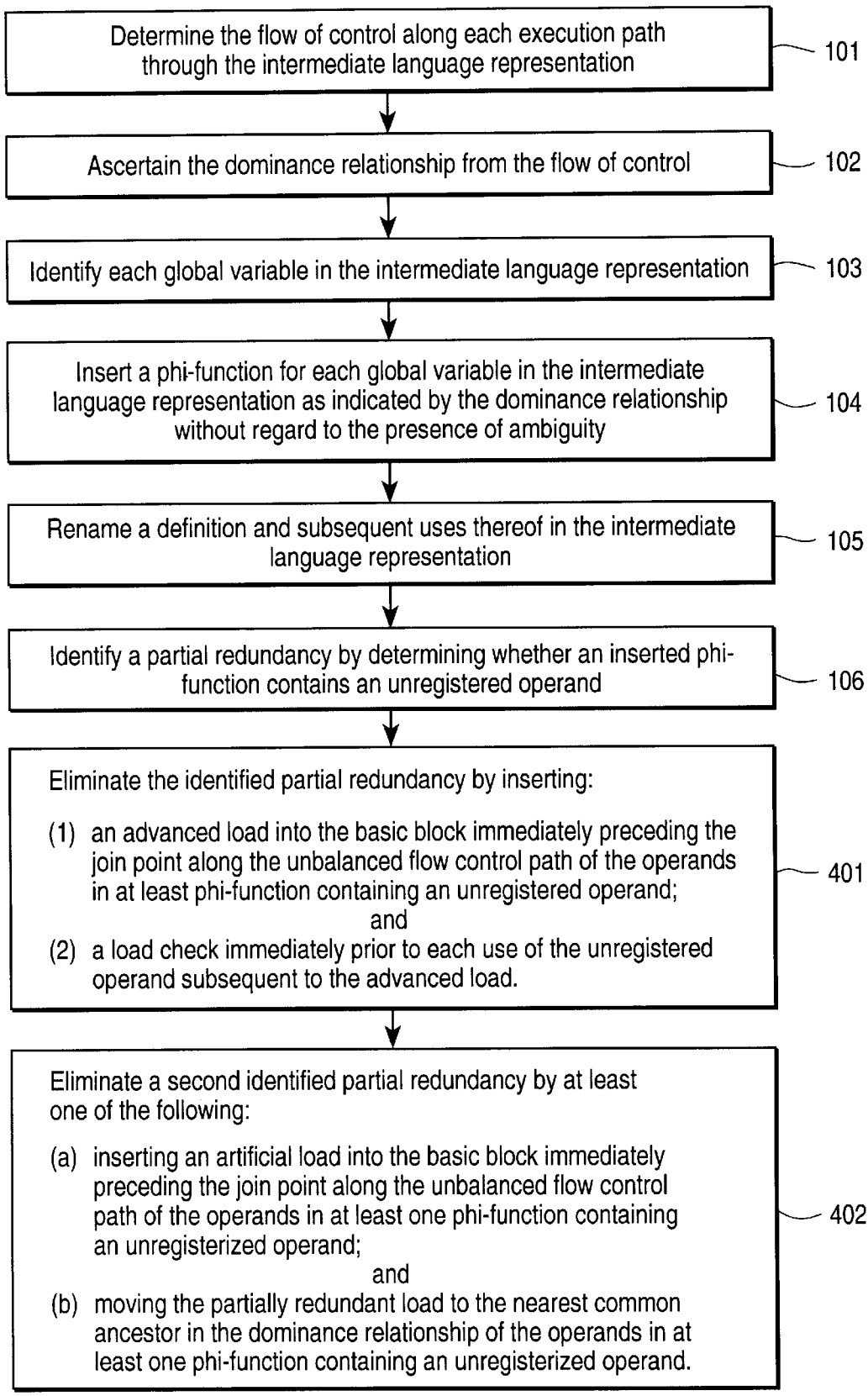

If the phi-nodes are inserted in a traditional manner, i.e., only in the absence of ambiguity, the PRF may be accomplished by any of the techniques illustrated in FIGS. 3A–3C. FIGS. 3B–3C illustrate two techniques disclosed and claimed in my co-pending application Ser. No. 08/829,847, entitled "A Method for Identifying Partial Redundancies in an Existing Processor Architecture," and previously incorporated by reference. As shown in FIG. 3B, blocks 305, 306, 307, 308 a partial redundancy may be eliminated by inserting an artificial load into the basic block immediately preceding the join point along the unbalanced flow control path of the operands in at least one phi-function containing an unregisterized operand. As shown in FIG. 3C, blocks 309, 310, 311, 312, a partial redundancy may alternatively be eliminated by moving the partially redundant load to the nearest common ancestor in the dominance relationship of the operands in at least one phi-function containing an unregisterized operand. Thus, the technique of FIG. 3A may be utilized with traditional phi-node insertion techniques as illustrated in FIG. 4A, blocks 101, 102, 103, 104, 105, 106, 401, and may be combined with those of FIGS. 3B and 3C as illustrated in FIG. 4B, blocks 101, 102, 103, 104, 105, 106, 401, 402.

Figure 3D:
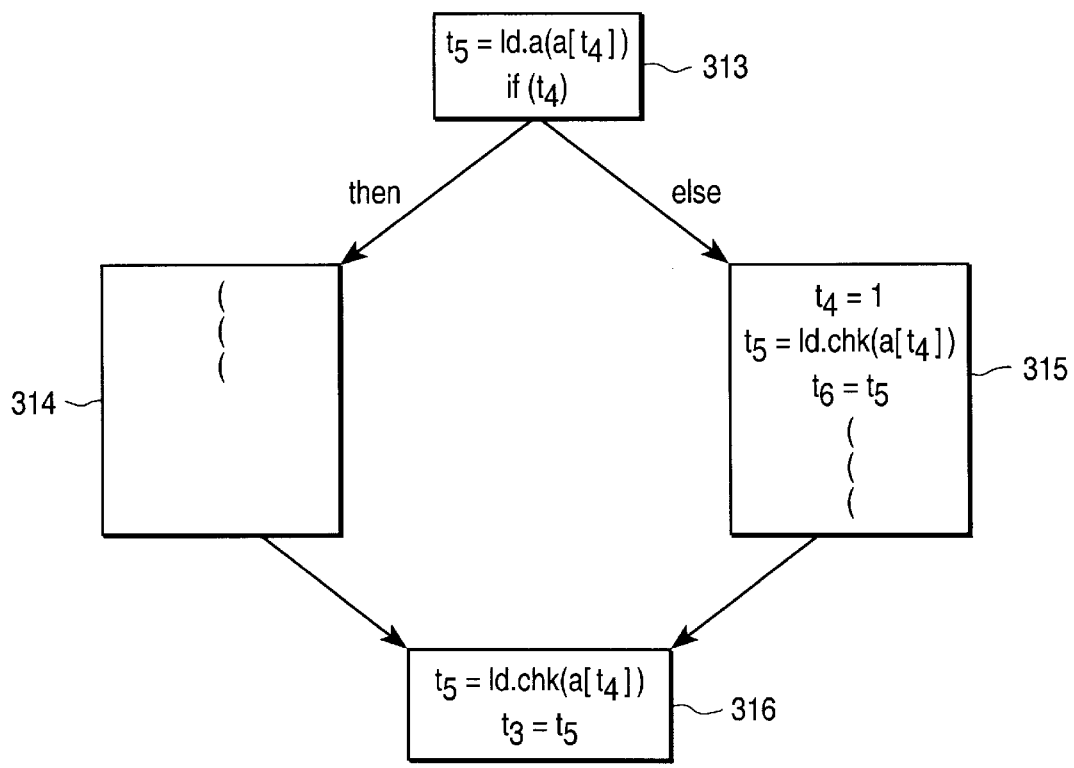
FIG. 3D conceptually illustrates code motion arising from phi-node removal from the illustration in FIG. 3A.

As is well known in the art, phi-nodes are artificial constructs used only during the compilation process and must be removed before machine readable object code is generated from the otherwise final intermediate language representation. Phi-node removal in this embodiment may, if desired, be performed immediately upon finishing partial redundancy elimination. FIG. 3D, blocks 313, 314, 315, 316, conceptually illustrates code motion in removing phi-nodes.

Figure 5A:
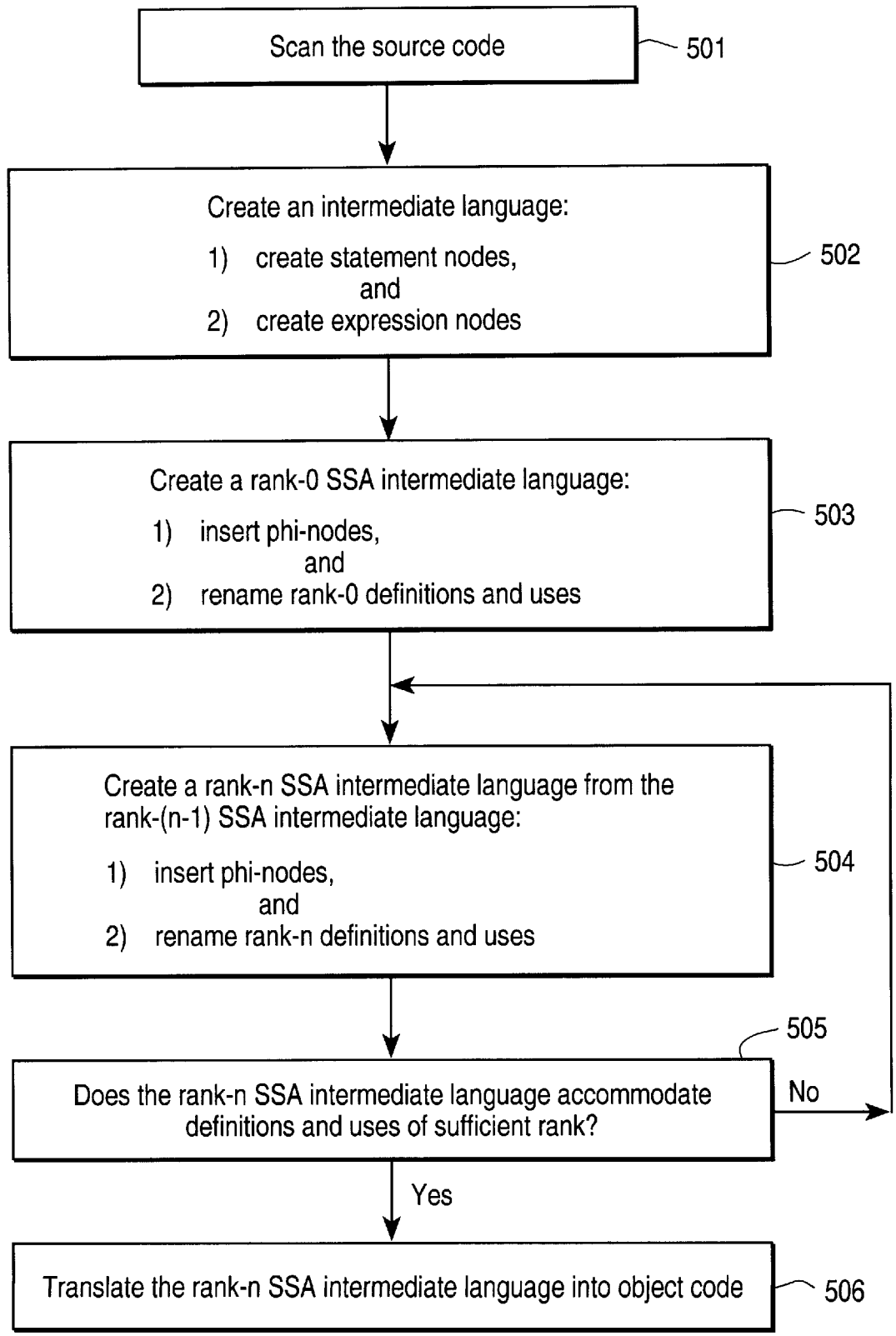
FIG. 5A illustrates a method for translating at least a portion of high-level source code into a rank-n SSA intermediate language as disclosed and claimed in my co-pending application Ser. No. 08/831,074, filed Apr. 1, 1997, entitled "Method for Constructing a Static Single Assignment language Accommodating Complex Symbolic Memory References;"

One specific embodiment of the invention utilizes the invention in compiling the source code into a rank-n SSA intermediate language, wherein n is a positive integer greater than zero. The general method for generating a rank-0 SSA intermediate language representation is illustrated in FIG. 5A and is disclosed and claimed in my application Ser. No. 08/831,074, filed Apr. 1, 1997, entitled "Method for Constructing a Static Single Assignment Language Accommodating Arbitrarily Complex Symbolic Memory References," and commonly assigned herewith. A rank-n SSA intermediate language representation of this type is particularly advantageous in that it guarantees upon completion that any use is reached by one, and only one, unique, dominating definition regardless of how complex any given symbolic expression may be.

Figure 5B:
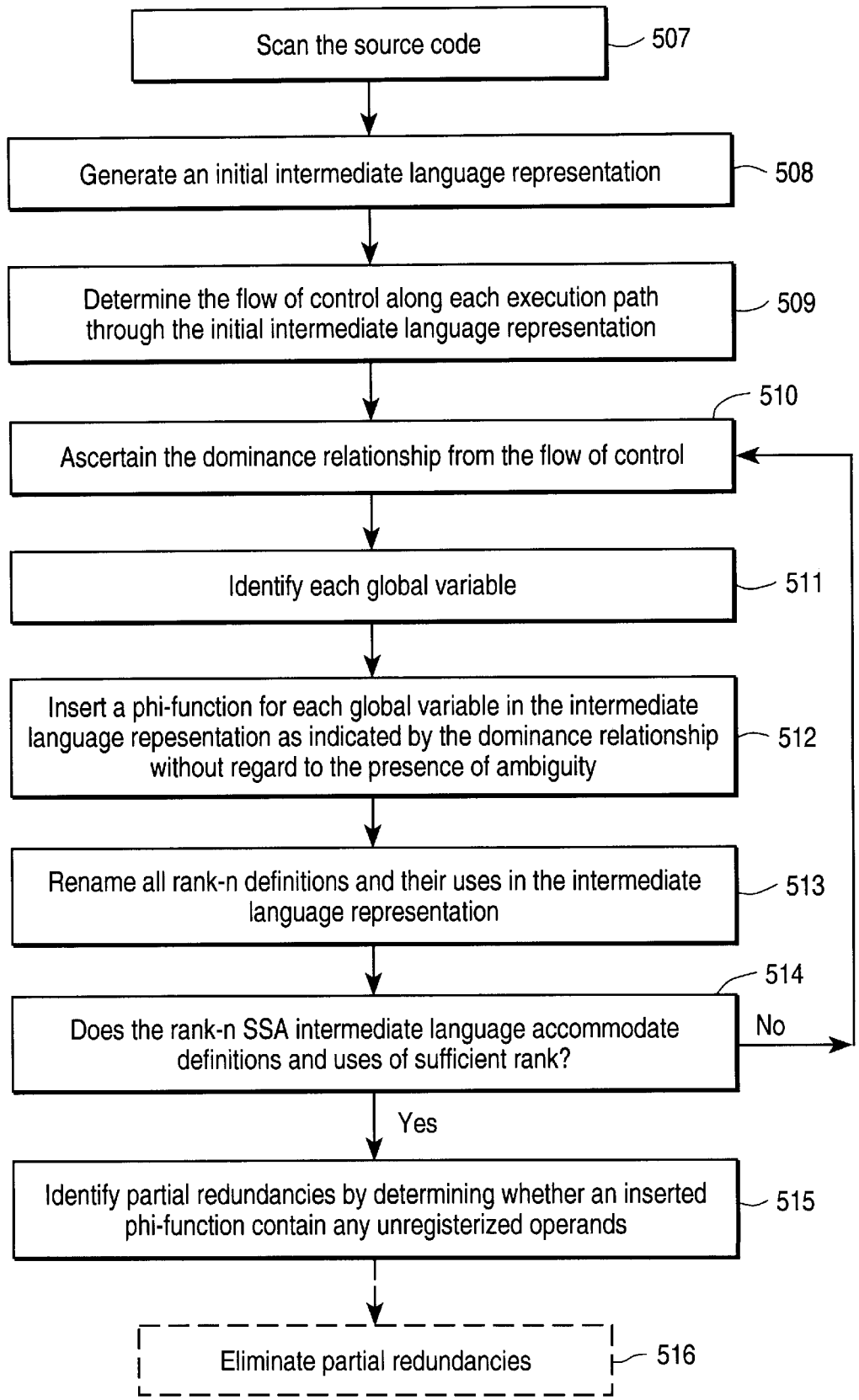
FIG. 5B illustrates an embodiment of the invention in which the method for constructing a rank-n SSA intermediate language representation illustrated in FIG. 5A is incorporated into a specific embodiment of the invention in FIG. 1.

The particular embodiment of the present invention illustrated in FIG. 1 incorporating the method of FIG. 5A is disclosed in FIG. 5B. In this embodiment, partial redundancies are eliminated during compilation of the final intermediate language representation. The method of FIG. 5B, blocks 507, 508, 509, 510, 511, 512, 513, 514, 515, 516, fully performs the method of FIG. 5A, blocks 501, 502, 503, 504, 505, 506, as modified, and the rank-n SSA representation is completed before eliminating partial redundancies so that all rank-n definitions and their uses are renamed. Each part of the invention set forth in FIG. 1 beginning with ascertaining the dominance relationship through renaming is performed for each iteration in which a rank-n SSA representation is generated from a rank-(n−1) representation. This aspect is shown more fully in FIG. 5B. The elimination of partial redundancies can then be performed in the manner described above for rank-0 SSA intermediate language representations as well as combined with other alternative embodiments such as common subexpression elimination, removal of loop invariant motion, and coloring out as disclosed below.

As indicated above, there are several techniques for determining the flow of control. One specific embodiment of the present invention as disclosed above determines the flow of control through the intermediate language representation by constructing a "flow control graph" utilizing techniques well known in the art. Flow graphs can involve much higher complexity than is shown in FIG. 2A. Flow control graphs for relatively complicated programs may in actuality consist of a plurality of related flow control graphs, the union of which is necessary to define the flow of control throughout the entire intermediate language representation. Flow control graphing also may be conducted on all or only a part of the intermediate language representation. Compilers frequently graph only a portion of an intermediate language representation at any given time because of operational constraints such as limited memory or microprocessor capability when compiling lengthy or complex source code.

However, the flow control graph need not be constructed from such a rank-n SSA intermediate language representation. For instance, phi-nodes may be inserted into a portion of a program that is "reducible" without using a flow control graph, albeit with less than optimal results as is well known in the art. Furthermore, one particular embodiment of the invention utilizes a "dominator-join" graph as discussed more fully below. Still other embodiments may combine one or more of these techniques as conditions permit or require. Therefore, not all embodiments of the present invention must necessarily use a flow control graph to determine the flow of control through the intermediate language representation.

One specific embodiment of the invention employs a particular symbolic mapping technique. When a computer program is translated into a SSA intermediate language representation, each variable definition and its uses are given a unique name. For instance, in the examples throughout this specification variables are renamed as temps $t_1$, $t_2$, etc., the definitions of which are symbolic expressions. Compilers traditionally "map" symbolic expressions like variables, temps, arrays, and pointers into a symbol table. A symbol table is a data structure comprising a record for each symbolic expression with selected information about that expression such as an absolute address. Mapping symbolic expressions into symbol tables provides a relatively quick table-lookup to determine the definition site of any symbolic expression as well as quickly store and retrieve data relative to the expression. Mapping symbolic expressions is well known in the art and any such mapping technique may be utilized. However, the particular technique mentioned above is disclosed more fully in my co-pending application Ser. No. 08/831,739, entitled "A Method of Using Static Single Assignment to Color Out Artificial Register Dependencies," filed Apr. 1, 1997.

Computer programs transfer data between constants, variables, and files by the execution of statements, procedures, and modules. This data can be said to "flow" through a computer program. Some compilers analyze this flow of data and perform certain optimizations based on the analysis results. When conventional compilers perform data flow analysis, unambiguous definitions of variables may be propagated globally throughout the computer program. However, recent advances in compiler design have created a need to propagate ambiguous definitions globally throughout a computer program.

As indicated above, there are several ways of ascertaining the dominance relationship from the flow of control. One particular embodiment of the invention determines dominance relationships among instructions or basic blocks without regard to whether any particular symbolic expressions are ambiguously defined. Another particular embodiment employs a common analytical tool known as "a dominator tree," as set forth above. Still another embodiment employs what are known as "dominator-join" graphs that not only ascertain the dominance relationship, but also determine the flow of control. Still other embodiments may combine one or more of these techniques as conditions permit or require.

Figure 6:
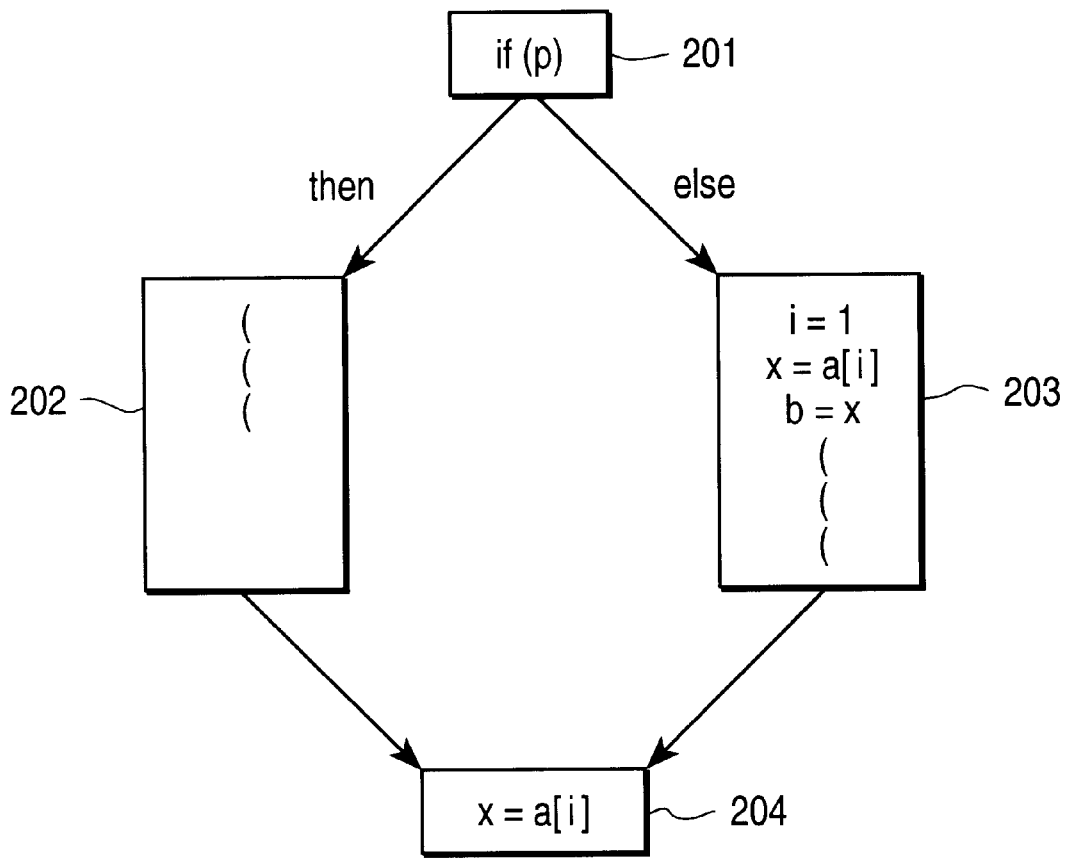
FIG. 6 conceptually illustrates a "dominator-join" graph as is known in the art and employed in one alternative embodiment of the invention.

FIG. 6 illustrates a dominator-join graph for code whose flow control graph and dominator tree are shown in FIGS. 2A–2B. As in a flow control graph and a dominator tree, each basic block inhabits a single node. However, a dominator-join graph contains directed edges representing both the flow of control and the dominance relationship. In FIG. 6, the flow of control is indicated by solid directed edges and the dominance relationship by broken directed edges. This may be confirmed by a quick comparison to both FIGS. 2A and 2B. Dominator-join graphs are known to the art and a fuller explanation can be found in Vugranam C. Sreedhar, *Efficient Program Analysis Using Dominator-Join Graphs,* Ph.D. Thesis, School of Computer Science, McGill University, Quebec, Canada (1995), which is hereby expressly incorporated by reference to teach the state of the art regarding dominator-join graphs.

Figure 7:
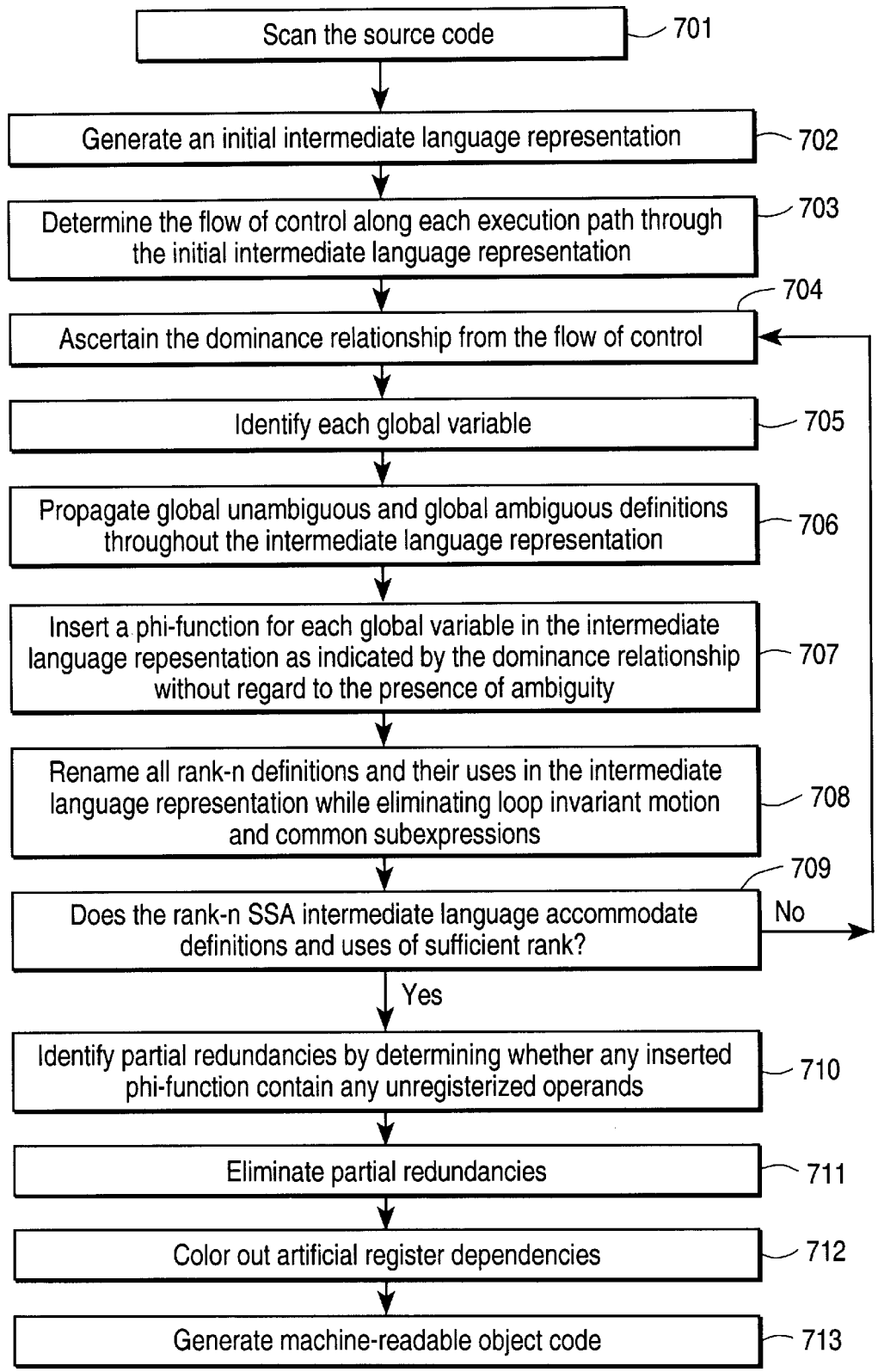
FIG. 7 illustrates a specific embodiment of the invention incorporating a number of various alternative embodiments disclosed herein.

One specific embodiment incorporates all the various alternative embodiments discussed above as illustrated in FIG. 7, blocks 701, 702, 703, 704, 705, 706, 707, 708, 709, 710, 711, 712, 713. This alternative embodiment not only eliminates partial redundancies 711, but also eliminates both loop invariant motion and common subexpressions 708—all in the context of a rank-n SSA intermediate language representation. Note that PRE 711 and coloring out 712 are performed after the rank-n SSA intermediate language is generated while common subexpressions and loop invariant motion are eliminated while renaming definitions and uses in each iteration of the generation, as shown in block 708. Note also that this embodiment includes not only the present invention, but also generation of the initial intermediate language representation 702 and machine readable object code 713 on either end. These types of variations are disclosed more fully in the following applications:

(1) ambiguous constant propagation such as, for example, is disclosed and claimed in my co-pending U.S. patent application Ser. No. 08/831,159, filed Apr. 1, 1997, entitled "A Method for Determining the Set of Variables that May Be Ambiguously Defined at a Point in a Computer Program;"

(2) eliminating common subexpression such as, for example, is set forth in my co-pending U.S. patent application Ser. No. 08/829,856, entitled "A Method For Performing Common Subexpression Elimination on a Rank-n Static Single Assignment Language;"

(3) coloring out artificial register dependencies such as, for example, is set forth in my co-pending U.S. patent application Ser. No. 08/831,739, filed Apr. 1, 1997, entitled "A Method of Using Static Single Assignment to Color Out Artificial Register Dependencies;" and (4) eliminating loop invariant motion such as, for example, is set forth in my co-pending U.S. patent application Ser. No. 08/829,980, filed Apr. 1, 1997, entitled "A Method for Optimizing a Loop in a Computer Program by Removing Loop-Invariant Loads Outside of a Loop."

Each of these applications was previously incorporated by reference.

Indeed, one alternative embodiment of the present invention incorporates all the variations discussed above as set forth in FIG. 7. The pseudo code representation for the embodiment of FIG. 7 may be written as:

```
SSA_Main(entry_bblock){
    SSA_Upwards_Exposed(entry_bblock)
    SSA_Propagate_Ambiguous_Definitions (entry_bblock)
    SSA_Insert_Phi_Nodes()
    SSA_Rename(entry_bblock)
    SSA_Partial_Redundancy(all_phis)
SSA_Rename(bblock){
    SSA_Push(bblock)
    FOR_EACH_BBLOCK_SUCC(bblock,succ){
        SSA_Rename_Phi(bblock,succ)
        SSA_Rename(succ)
    }
    SSA_Pop(bblock)
}
SSA_Push(bblock){
    FOR_EACH_BBLOCK_STMT(bblock,stmt){
        FOR_EACH_STMT_RVAL_EXPR(stmt,rval_expr){
            value_number=SYM_Hash(rval_expr)
            IF (exists a reaching def on top of stack[value_number])
                SSA_Optimize_Use(stmt,rval_expr)
            ELSE
                SSA_Stack_Push(value_number,rval_expr)
        }
        SSA_Invariant_Stmt(stmt)
        FOR_EACH_LVAL_EXPR(stmt lval_expr){
            SSA_Stack_Push(value_number,lval_expr)
        }
    }
}
SSA_Optimize_Use(stmt,use_expr){
    def_expr=Stack_TOS(SYM_Hash(use_expr))
    IF (ssa_Invariant_P(def_expr,use_expr))
        ssa_Registerize_Invarient(use_expr)
    ELSE{
        IF (RVAL_def_p(def_expr))
            IF(ssa_Partial_Motion(use_expr))
                RETURN
            ELSE
                ssa_CSE(use_expr)
            ELSE
                ssa_Registerize_Flow_Dependence(use_expr)
    }
}
```

This particular embodiment is extremely powerful in that it unifies into a single framework a wide variety of optimizations previously applied on an ad hoc and inefficient basis. More particularly, optimizations such as eliminating loop invariant motion, common subexpressions, and partial redundancies can be performed while constructing the intermediate language representation. Furthermore, when used in the variation generating a rank-n SSA intermediate language representation, the optimizations can even be performed on arbitrarily complex expressions. Crucial to this implementation is the placement of phi-nodes as set forth above. In summary, phi-nodes are created for any symbolic expression, for single global definitions, and regardless of interfering ambiguous definitions. Thus, this variation permits optimizations in very complex situations that traditional frameworks miss. Still further, the variation employing the partial redundancy elimination technique for existing processor architectures that heeds the presence of ambiguity can be used on practically any processor architecture.

It can be seen from the above disclosure that the present invention readily identifies partial redundancies in a manner previously unknown and unsuspected in the art. In some embodiments the invention eliminates partial redundancies with an absolute minimum of compile time and automatically effects code motion with the minimum life time expansion in a manner heretofore unknown in the art. More particularly, the advantages of this invention in its various embodiments are that it (1) identifies partially redundant memory references without any bitsets or iterative data flow calculations; (2) determines optimal positions to for desirable code motion with trivial calculations; (3) reduces the size of the compiler by factors of 10 in code size for portions of the optimizer by simple augmentation of the SSA handler; (4) provides a general framework in which to generate advanced loads; and (5) provides a framework to perform data flow analysis in the presence of speculative definition points.

Any of the foregoing methods may be implemented by programming a suitable general purpose computer. The programming may be accomplished through the use of a program storage device readable by the general purpose computer and encoding a program of statements executable by the computer for performing the operations described above. The program storage device may take the form of, e.g., one or more floppy disks, a hard disk, a CD ROM or other optical or magnetic-optical disk, a magnetic tape, a read-only memory chip (ROM), and other kinds of storage devices. The program of statements may be source code or object code, or a high-level language, or in some intermediate form such as a partially compiled code. The precise forms of the program storage device and of the encoding of statements are immaterial.

It will be appreciated by those of ordinary skill in the art relevant hereto having the benefit of this disclosure that the illustrative embodiments described above are capable of numerous variations without departing from the scope and spirit of the invention. While the particular embodiments disclosed above are presented utilizing C pseudo code, they are not limited to C. The invention may be applied to any computer program such as C++, FORTRAN, COBOL, PASCAL, etc. Furthermore, the methods may be performed on a computer program written or stored in object code or machine language as well as source code. Still further, the methods may be performed on a computer program stored in an intermediate compiler language that may be utilized to perform other optimizations prior to translation to object code. In addition, while the sequence of acts are presented in a specific order, the order may be modified unless otherwise indicated.

Accordingly, the exclusive rights sought herein are as described in the claims below.

What is claimed is:

1. A method for compiling at least a portion of a computer program, the method comprising:
   (a) inserting a phi-function for a global variable reaching a join point in an intermediate language representation subsequent to the join point even in the presence of ambiguity;
   (b) renaming a definition and any subsequent use of the definition in the intermediate language representation; and
   (c) identifying a partially redundant load by determining whether any operands of the inserted phi-function have not been renamed.

2. The method of claim 1, wherein the acts (a)–(b) are repeated at least once before identifying the partially redundant load.

3. The method of claim 1, wherein the acts (a)–(b) are repeated until all complex definitions and their uses have been accommodated.

4. The method of claim 1, further comprising eliminating the partial redundancy of the identified partially redundant load.

5. The method of claim 4, wherein the identified partial redundancy is eliminated by inserting:
   (1) an advanced load preceding the join point along an unbalanced flow control path of the operands in the phi-function; and (2) a load check prior to each use of the operand not renamed subsequent to the advanced load.

6. The method of claim 1, wherein a plurality of phi-functions is inserted and the method further comprises maintaining a linked list of inserted phi-function locations.

7. The method of claim 1, wherein the act of renaming definitions includes at least one of the following:

(1) performing a depth-first ordered traversal of the intermediate language representation; and (2) assigning temp values to each rank-0 expression encountered during the traversal.

8. The method of claim 1, wherein a plurality of instructions comprising the portion of the computer program is partitioned into basic blocks.

9. The method of claim 1, further comprising generating machine readable code.

10. A program storage device encoding statements for compiling at least a portion of a computer program, the statements defining a method comprising:

(a) inserting a phi-function for a global variable reaching a join point in an intermediate language representation subsequent to the join point even in the presence of ambiguity;

(b) renaming a definition and any subsequent use of the definition in the intermediate language representation; and (c) identifying a partially redundant load by determining whether any operands of the inserted phi-function have not been renamed.

11. The device of claim 10, wherein the acts (a)–(b) are repeated at least once before identifying the partially redundant load.

12. The device of claim 10, wherein the acts (a)–(b) are repeated until all complex definitions and their uses have been accommodated.

13. The device of claim 10, further comprising eliminating the partial redundancy of the identified partially redundant load.

14. The device of claim 13, wherein the identified partial redundancy is eliminated by inserting:

(1) an advanced load preceding the join point along an unbalanced flow control path of the operands in the phi-function; and (2) a load check prior to each use of the operand not renamed subsequent to the advanced load.

15. The device of claim 10, wherein a plurality of phi-functions is inserted and the method further comprises maintaining a linked list of inserted phi-function locations.

16. The device of claim 10, wherein the act of renaming definitions includes at least one of the following:

(1) performing a depth-first ordered traversal of the intermediate language representation; and (2) assigning temp values to each rank-0 expression encountered during the traversal.

17. The device of claim 10, wherein a plurality of instructions comprising the portion of the computer program is partitioned into basic blocks.

18. The device of claim 10, further comprising generating machine readable code.

19. A method for compiling at least a portion of a computer program, wherein a phi-function having a plurality of operands has been inserted for a global variable reaching a join point subsequent to the join point and a definition and any subsequent use thereof has been renamed, the method comprising:

(a) identifying a partially redundant load by determining whether the inserted phi-function contains an unregisterized operand;

(b) inserting an advanced load preceding the join point along an unbalanced flow control path of the operands in the phi-function; and (c) inserting a load check prior to each use of the unregisterized operand subsequent to the advanced load.

20. The method of claim 19, further comprising eliminating a second identified partially redundant load by at least one of the following:

(1) inserting an artificial load preceding the join point along an unbalanced flow control path of the operands in the phi-function; and (2) moving the partially redundant load to a nearest common ancestor in a dominance relationship of the operands in the one phi-function.

21. The method of claim 19, wherein a plurality of phi-nodes is inserted and the method further comprises maintaining a linked list of inserted phi-function locations.

22. The method of claim 19, wherein a plurality of instructions comprising the portion of the computer program is partitioned into basic blocks.

23. The method of claim 19, further comprising generating machine readable code.

24. A program storage device encoding statements for compiling at least a portion of a computer program, wherein a phi-function having a plurality of operands has been inserted for a global variable reaching a join point subsequent to the join point and a definition and any subsequent use thereof has been renamed, the method comprising:

(a) identifying a partially redundant load by determining whether the inserted phi-function contains an unregisterized operand;

(b) inserting an advanced load preceding the join point along an unbalanced flow control path of the operands in the phi-function; and (c) inserting a load check prior to each use of the unregisterized operand subsequent to the advanced load.

25. The method of claim 24, further comprising eliminating a second identified partially redundant load by at least one of the following:

(1) inserting an artificial load preceding the join point along an unbalanced flow control path of the operands in the phi-function; and (2) moving the partially redundant load to a nearest common ancestor in a dominance relationship of the operands in the one phi-function.

26. The method of claim 24, wherein a plurality of phi-nodes is inserted and the method further comprises maintaining a linked list of inserted phi-function locations.

27. The method of claim 24, wherein a plurality of instructions comprising the portion of the computer program is partitioned into basic blocks.

28. The method of claim 24, further comprising generating machine readable code.

29. A method for compiling at least a portion of a computer program, the method comprising:

(a) determining a flow of control along an execution path through an intermediate language representation of the portion of the computer program;

(b) ascertaining a dominance relationship from the flow of control;

(c) identifying a global variable in the intermediate language representation reaching a join point;

(d) inserting a phi-function having a plurality of operands for the global variable in the intermediate language representation subsequent to the join point as indicated by the dominance relationship even in the presence of ambiguity;

(e) renaming a definition and any subsequent use of the definition in the intermediate language representation; and (f) identifying a partially redundant load by determining whether any operands of the inserted phi-function have not been renamed.

30. The method of claim 28, wherein the acts (b)–(e) are repeated at least once before identifying the partially redundant load.

31. The method of claim 30, wherein acts, (b)–(e) are repeated until all complex definitions and their uses have been accommodated.

32. The method of claim 29, further comprising eliminating the partial redundancy of the identified partially redundant load.

33. The method of claim 32, wherein the identified partial redundancy is eliminated by inserting:

(1) an advanced load preceding a join point reached by the global variable along an unbalanced flow control path of the operands in the phi-function; and (2) a load check prior to each use of the operand not renamed subsequent to the advanced load.

34. The method of claim 29, wherein determining the flow of control includes at least one of the following:

(1) constructing a flow control graph; and (2) constructing a dominator-join graph.

35. The method of claim 29, wherein ascertaining the dominance relationship includes at least one of the following:

(1) constructing a dominator tree;

(2) constructing a dominator-join graph; and (3) calculating an iterative dominance frontier for each instruction.

36. The method of claim 29, wherein a plurality of phi-functions is inserted and the method further comprises maintaining a linked list of inserted phi-function locations.

37. The method of claim 29, wherein renaming the definition and any subsequent uses of the definition includes:

(1) performing a depth-first ordered traversal of the intermediate language representation; and (2) assigning temp values to each rank-0 expression encountered during the traversal.

38. The method of claim 29, wherein instructions are partitioned into basic blocks.

39. The method of claim 29, further comprising generating machine readable code.

40. A program storage device encoding statements for compiling at least a portion of a computer program, the statements defining a method comprising:

(a) determining a flow of control along an execution path through an intermediate language representation of the portion of the computer program;

(b) ascertaining a dominance relationship from the flow of control;

(c) identifying a global variable in the intermediate language representation;

(d) inserting a phi-function having a plurality of operands for the global variable in the intermediate language representation as indicated by the dominance relationship even in the presence of ambiguity;

(e) renaming a definition and any subsequent uses of the definition in the intermediate language representation; and (f) identifying a partially redundant load by determining whether any operands of the inserted phi-function have not been renamed.

41. The device of claim 40, wherein the acts (b)–(e) are repeated at least once before identifying the partially redundant load.

42. The device of claim 40, wherein the acts (b)–(e) are repeated until all complex definitions and their uses have been accommodated.

43. The device of claim 40, further comprising eliminating the partial redundancy of the identified partially redundant load.

44. The device of claim 43, wherein the partial redundancy is eliminated by inserting:

(1) an advanced load preceding a join point reached by the global variable along an unbalanced flow control path of the operands in the phi-function; and (2) a load check prior to each use of the operand not renamed subsequent to the advanced load.

45. The device of claim 40, wherein determining the flow of control includes at least one of the following:

(1) constructing a flow control graph; and (2) constructing a dominator-join graph.

46. The device of claim 40, wherein ascertaining the dominance relationship includes at least one of the following:

(1) constructing a dominator tree;

(2) constructing a dominator-join graph; and (3) calculating an iterative dominance frontier for each instruction.

47. The device of claim 40, wherein a plurality of phi-functions is inserted and the method further comprises maintaining a linked list of inserted phi-function locations.

48. The apparatus of claim 40, wherein renaming the definition and any subsequent uses of the definition includes:

(1) performing a depth-first ordered traversal of the intermediate language representation; and (2) assigning temp values to each rank-0 expression encountered during the traversal.

49. The apparatus of claim 40, wherein a plurality of instructions comprising the portion of the computer program is partitioned into basic blocks.

50. The apparatus of claim 40, further comprising generating machine readable code.

51. A method for compiling at least a portion of a computer program into machine readable object code, the method comprising:

(a) determining a flow of control along an execution path through an intermediate language representation of the portion of the computer program;

(b) ascertaining a dominance relationship from the flow of control;

(c) identifying a global variable in the intermediate language representation reaching a join point;

(d) inserting a phi-function having a plurality of operands for the global variable in the intermediate language representation subsequent to the join point as indicated by the dominance relationship;

(e) renaming a definition and only subsequent use of the definition in the intermediate language representation;

(f) identifying a partially redundant load by determining whether any operands of the inserted phi-function have not been renamed; and (g) eliminating the partial redundancy of the identified partially redundant load by inserting:

(1) an advanced load preceding a join point along an unbalanced flow control path of the operands in the inserted phi-function; and (2) a load check prior to each use of the operand not renamed subsequent to the advanced load.

52. The method of claim 51, wherein the acts (b)–(e) are repeated at least once before identifying the partially redundant load.

53. The method of claim 51, wherein the acts (b)–(e) are repeated until all complex definitions and their uses have been accommodated.

54. The method of claim 51, further comprising eliminating a second identified partially redundancy load by at least one of the following:

(1) inserting an artificial load preceding the join point along the unbalanced flow control path of the operands in the inserted phi-function; and (2) moving the second partially redundant load to a nearest common ancestor in the dominance relationship of the operands in the inserted phi-function.

55. The method of claim 51, wherein determining the flow of control includes at least one of the following:

(1) constructing a flow control graph; and (2) constructing a dominator-join graph.

56. The method of claim 51, wherein ascertaining the dominance relationship includes at least one of the following:

(1) constructing a dominator tree;

(2) constructing a dominator-join graph; and (3) calculating an iterative dominance frontier for each instruction.

57. The method of claim 51, wherein a plurality of phi-nodes is inserted and the method further comprises maintaining a linked list of inserted phi-function locations.

58. The method of claim 51, wherein renaming the definitions and any subsequent use of the definition includes:

(1) performing a depth-first ordered traversal of the intermediate language representation; and (2) assigning temp values to each rank-0 expression encountered during the traversal.

59. The method of claim 51, wherein a plurality of instructions comprising the portion of the computer program is partitioned into basic blocks.

60. The method of claim 51, further comprising generating machine readable code.

61. A program storage device encoding statements for compiling at least a portion of a computer program into machine readable object code, the statements defining a method comprising:

(a) determining a flow of control along an execution path through an intermediate language representation of the portion of the computer program;

(b) ascertaining a dominance relationship from the flow of control;

(c) identifying a global variable in the intermediate language representation reaching a join point;

(d) inserting a phi-function having a plurality of operands for the global variable in the intermediate language representation subsequent to the join point as indicated by the dominance relationship;

(e) renaming a definition and any subsequent uses of the definition in the intermediate language representation;

(f) identifying a partially redundant load by determining whether any operands of the inserted phi-function have not been renamed; and (g) eliminating the partial redundancy of the identified partially redundant load by inserting:

(1) an advanced load preceding the join point along an unbalanced flow control path of the operands in the inserted phi-function; and (2) a load check prior to each use of the operand not renamed subsequent to the advanced load.

62. The method of claim 61, wherein the acts (b)–(e) are repeated at least once before identifying the partially redundant load.

63. The method of claim 61, wherein a second partial redundancy from a second identified partially redundant load is eliminated by at least one of the following:

(1) inserting an artificial load preceding the join point along an unbalanced flow control path of the operands in the inserted phi-function; and (2) moving the partially redundant load to a nearest common ancestor in the dominance relationship of the operands in the inserted phi-function.

64. The method of claim 61, wherein the act of determining the flow of control includes at least one of the following:

(1) constructing a flow control graph; and (2) constructing a dominator-join graph.

65. The method of claim 61, wherein the act of ascertaining the dominance relationship includes at least one of the following:

(1) constructing a dominator tree;

(2) constructing a dominator-join graph; and (3) calculating an iterative dominance frontier for each instruction.

66. The method of claim 61, wherein a plurality of phi-nodes is inserted and the method further comprises includes maintaining a linked list of inserted phi-function locations.

67. The method of claim 61, wherein renaming the definition and any subsequent use of the definition includes:

(1) performing a depth-first ordered traversal of the intermediate language representation; and (2) assigning temp values to each rank-0 expression encountered during the traversal.

68. The method of claim 61, wherein a plurality of instructions comprising the portion of the computer program is partitioned into basic blocks.

69. The method of claim 61, further comprising generating machine readable code.

70. A method for compiling at least a portion of a computer program into machine readable object code, the method comprising:

(a) determining a flow of control along each execution path through an intermediate language representation, including constructing at least one of a flow control graph and a dominator-join graph;

(b) ascertaining a dominance relationship from the flow of control, including:

(1) constructing at least one of a dominator tree and a dominator-join graph; and (2) calculating an iterative dominance frontier for each instruction, (c) identifying each global variable in the intermediate language representation;

(d) inserting a phi-function for each global variable reaching a join point in the intermediate language representation as indicated by the dominance relationship even in the presence of ambiguity, including maintaining a linked list of a plurality of inserted phi-function locations;

(e) renaming a definition and subsequent uses thereof in the intermediate language representation, the renaming including:
   (1) performing a depth-first ordered traversal of the intermediate language representation; and
   (2) assigning temp values to each rank-n expression;

(f) repeating acts (b)–(e) at least once to create a rank-n SSA intermediate language where n is a positive integer greater than zero;

(g) identifying a partially redundant load by determining whether the inserted phi-function contains an unregisterized operand;

(h) eliminating the identified partial redundancy by inserting:
   (1) an advanced load into a basic block immediately preceding the join point along the unbalanced flow control path of the operands in at least one phi-function containing the unregisterized operand; and
   (2) a load check immediately prior to each use of the unregisterized operand subsequent to the advanced load; and (i) generating machine readable code.

71. A method for compiling at least a portion of high-level source code, into machine readable object code, the method comprising:

(a) determining a flow of control along each execution path through an intermediate language representation, including:
   (1) constructing at least one of the following:
     (A) a flow control graph; and
     (B) a dominator-join graph;

(b) ascertaining a dominance relationship from the flow of control, including:
   (1) constructing at least one of the following:
     (A) a dominator tree; and
     (B) a dominator-join graph; and
   (2) calculating an iterative dominance frontier for each instruction, (c) identifying each global variable in the intermediate language representation;

(d) inserting a phi-function for each global variable in the intermediate language representation as indicated by the dominance relationship, including maintaining a linked list of inserted phi-function locations;

(e) renaming definitions in the intermediate language representation, the renaming including:
   (1) performing a depth-first ordered traversal of the intermediate language representation; and
   (2) assigning temp values to each rank-n expression;

(f) repeating acts (b)–(e) at least once to create a rank-n SSA intermediate language where n is a positive integer greater than zero;

(g) identifying a partial redundancy by determining whether an inserted phi-function contains an unregisterized operand;

(h) eliminating the identified partial redundancy by inserting:
   (1) an advanced load into a basic block immediately preceding the join point along the unbalanced flow control path of the operands in at least one phi-function containing the unregisterized operand; and
   (2) a load check immediately prior to each use of the unregisterized operand subsequent to the advanced load;

(i) eliminating a second identified partial redundancy by at least one of the following:
   (1) inserting an artificial load into the basic block immediately preceding the join point along the unbalanced flow control path of the operands in at least one phi-function containing the unregistered operand after identifying the partial redundancy; and
   (2) moving the second identified partially redundant load to a nearest common ancestor in the dominance relationship of the operands in at least one phi-function containing the unregisterized operand after identifying the partial redundancy; and (j) generating machine readable code.

\* \* \* \* \*

UNITED STATES PATENT AND TRADEMARK OFFICE
CERTIFICATE OF CORRECTION

PATENT : 6,029,005
DATED : February 22, 2000
INVENTOR(S) : Radigan

It is certified that error appears in the above-identified patent and that said Letters Patent is hereby corrected as shown below:

In column 4, at line 54, after "point" insert --"--.

Signed and Sealed this

Fifteenth Day of May, 2001

Attest:

NICHOLAS P. GODICI

Attesting Officer     Acting Director of the United States Patent and Trademark Office